United States Patent

Choate et al.

[15] 3,678,470

[45] July 18, 1972

[54] STORAGE MINIMIZED OPTIMUM PROCESSOR

[72] Inventors: William C. Choate; Michael K. Masten, both of Dallas, Tex.

[73] Assignee: Texas Instruments Incorporated, Dallas, Tex.

[22] Filed: March 9, 1971

[21] Appl. No.: 122,513

Related U.S. Application Data

[63] Continuation-in-part of Ser. No. 837,425, June 30, 1969, abandoned, and a continuation of Ser. No. 889,240, Dec. 30, 1969, abandoned.

[52] U.S. Cl. ....................340/172.5

[51] Int. Cl. ....................G06f 3/05

[58] Field of Search ....................340/172.5, 146.3

[56] References Cited

UNITED STATES PATENTS

| | | | |
|---|---|---|---|
| 3,191,150 | 6/1965 | Andrews | 340/146.3 |
| 3,209,328 | 9/1965 | Bonner | 340/146.3 |
| 3,235,844 | 2/1966 | White | 340/172.5 |
| 3,319,229 | 5/1967 | Fuhr et al. | 340/172.5 |
| 3,435,422 | 3/1969 | Gerhardt et al | 340/172.5 |
| 3,457,552 | 7/1969 | Asendorf | 340/172.5 |
| 3,513,448 | 5/1970 | Armstrong | 340/172.5 |

*Primary Examiner*—Harvey E. Springborn

*Attorney*—Samuel M. Mims, Jr., James O. Dixon, Andrew M. Hassell, Hal Levine, Mel Sharp, Rene Grossman, James T. Comfort and D. Carl Richards

[57] ABSTRACT

A trainable signal processor having at least one input signal $u$ and one desired output signal $z$ applied thereto during training and having at least one input signal $u$ and one actual output signal $x$ derived therefrom during execution is provided. From each member of the input sequence $u(t_i)$ a key $K_i$ is generated. $K_i$ may have only a finite number of values and is a single valued function of $u$. Corresponding to a specific value of the $K_i$ generated during training a trained response is derived from samples of the desired output signal $z$ measured at instances $t_i$ at which that value of $K_i$ occurred and is maintained in a tree allocated file. The file thereby associates with each set of $K_i$ values a trained response. Storage is provided for only those sets of $K_i$ values which actually occurred during training, generally constituting a small fraction of those sets which may theoretically occur, particularly when the input is of multidimensional character. During execution the tree allocated file provides for efficient retrieval of the trained responses which are employed in determining the actual output signal of the processor.

10 Claims, 12 Drawing Figures

INVENTORS
WILLIAM C. CHOATE
MICHAEL K. MASTEN
S. Carl Richards
ATTORNEY

INVENTORS
WILLIAM C. CHOATE
MICHAEL K. MASTEN

S. Carl Richards

ATTORNEY

INVENTORS:
WILLIAM C. CHOATE
MICHAEL K. MASTEN

ATTORNEY

PATENTED JUL 18 1972

3,678,470

SHEET 06 OF 10

PATENTED JUL 18 1972 3,678,470

INVENTORS:
WILLIAM C. CHOATE
MICHAEL K. MASTEN

ATTORNEY

STORAGE MINIMIZED OPTIMUM PROCESSOR

This application is a continuation in part of U.S. Pat. application Ser. No. 837,425, filed June 30, 1969, entitled "Search Minimized Optimum Processor" by William C. Choate and Michael K. Masten, now abandoned, and a continuation of U.S. Pat. Application Ser. No. 889,240 filed Dec. 30, 1969, now abandoned, entitled "Storage Minimized Optimum Processor" by William C. Choate and Michael K. Masten, now abandoned.

This invention relates to the use of tree storage with high dynamic range quantization in a trainable optimal signal processor, and more particularly to methods and systems for training and using such processors.

A trainable processor is a device or system capable of receiving and digesting information in a training mode of operation and subsequently operating on additional information in an execution mode of operation in a manner learned in accordance with training.

The processes of receiving information and digesting it constitute training. Training is accomplished by subjecting the processor to typical input signals together with desired outputs or responses to these signals. The input/desired output signals used to train the processor are called training functions. During training the processor determines and stores cause-effect relationships between input and desired output. The cause-effection relationships determined during training are called trained responses.

The post training process of receiving additional information via input signals and operating on it in some desired manner to perform useful tasks is called execution. More explicitly, for the processors considered herein, the purpose of execution is to produce from the input signal an output, called the actual output, which is the best, or optimal, estimate of the desired output signal. There are a number of useful criteria defining "optimal estimate." One is minimum mean squared error between desired and actual output signals. Another, useful in classification applications, is minimum probability of error.

Optimal, nonlinear processors may be of the type disclosed in Bose U.S. Pat. No. 3,265,870, which represents an application of the nonlinear theory discussed by Norbert Weiner in his work entitled *Fourier Integral and Certain of Its Applications*, 1933, Dover Publications, Inc., or of the type described in application Ser. No. 732,152, filed May 27, 1968, for "-Feedback-Minimized Optimum Filters and Predictors."

Such processors have a wide variety of applications. In general, they are applicable to any problem in which the cause-effect relationship can be determined via training. While the present invention may be employed in connection with processors of the Bose type, the processor disclosed and claimed in said application Ser. No. 732,152 will be described forthwith to provide a setting for the description of the present invention.

The extend to which training must be extended in general may not be anticipated with certainty. Storage must be provided during training for unique sets of input signals encountered during training as well as trained responses for each set.

It has been discovered that the efficiency of storage and retrieval of trained responses may be greatly enhanced by use of the present invention which involves tree storage in a random access memory and selected quantization of the members of the signal set (keys). More particularly, in accordance with the present invention an automatic trainable signal processing machine is provided where a set of input signals which are single valued functions of time, including at least one input signal $u$, is used in training along with a desired output signal $z$. Samples of each set of input signals are quantized by conversion to digital representations, and the quantized value of each member of each set are stored in tree storage array as a key. Trained responses dependent upon the signals $u$ and $z$ are stored in random access memory locations at storage locations used only as a new key is encountered thereby to store a trained response of the processor for each key. Following training, trained responses are extracted from storage locations determined by samples of a like set of input signals.

In a further aspect, a trainable processor is provided where successive sets of samples of signals are employed. Means are provided for storing in digital quantized form each member of each contemporary set of input signals and the contemporary value of the desired processor response for the contemporary set. Means in the processor generate a trained response dependent upon the input set and the desired response. Means including an addressable memory stores at successive memory locations the members of the first input set in a selected order followed by the trained response of the processor to the first set and the desired response. Comparator means compare, in the selected order, members of each subsequent input set with corresponding members in memory. Logic means responsive to comparator means store at successive locations in memory any member of a subsequent input set which does not match its corresponding stored member and store thereafter subsequent members in the selected order along with a trained response for the subsequent input set. Logic means responsive to the comparators may then modify the trained response of a prior input set when a subsequent set matches corresponding members in storage. The system may be structured in response to hardware or software for applying programmed instructions to an automatic data processing machine for carrying out the method of the present invention.

For a more complete understanding of the present invention and for further objects and advantages thereof, reference may now be had to the following description taken in conjunction with the accompanying drawings in which.

FIG. 1: TRAINING PHASE

In the following description, the use of a bar under a given symbol, e.g., $u$, signifies that the signal so designated is a multicomponent signal, i.e., a vector. For example, $u = [u_1(t)\ u_2(t)]^T$, where $u_1(t) = u(t)$, and $u_2(t) = [u(t) - u(t-T)]$. The improvement in the processor disclosed in Ser. No. 732,152 is accomplished through the use of a feedback component derived from the delayed output signal, $x(t-T)$. This component serves as a supplemental input which typically conveys far more information than a supplemental input vector derived from the input sequence $u(t-kT)$, $k = 1, 2$, of the same dimensionality. Thus the storage requirements for a given level of performance are materially reduced. As in the Bose patent, the processor is trained in dependence upon some known or assumed function $z$ which is a desired output such that the actual output function $x$ is made to correspond to $z$ for inputs which have statistics similar to $u$. Thereafter, the processor will respond to signals $u'$, $u''$, etc., which are of the generic class of $u$ in a manner which is optimum in the sense that the average error squared between $z$ and $x$ is minimized. In the following description, the training phase will first be discussed following which the changes to carry out operations during execution on signals other than those used for training will be described.

Figure 1:
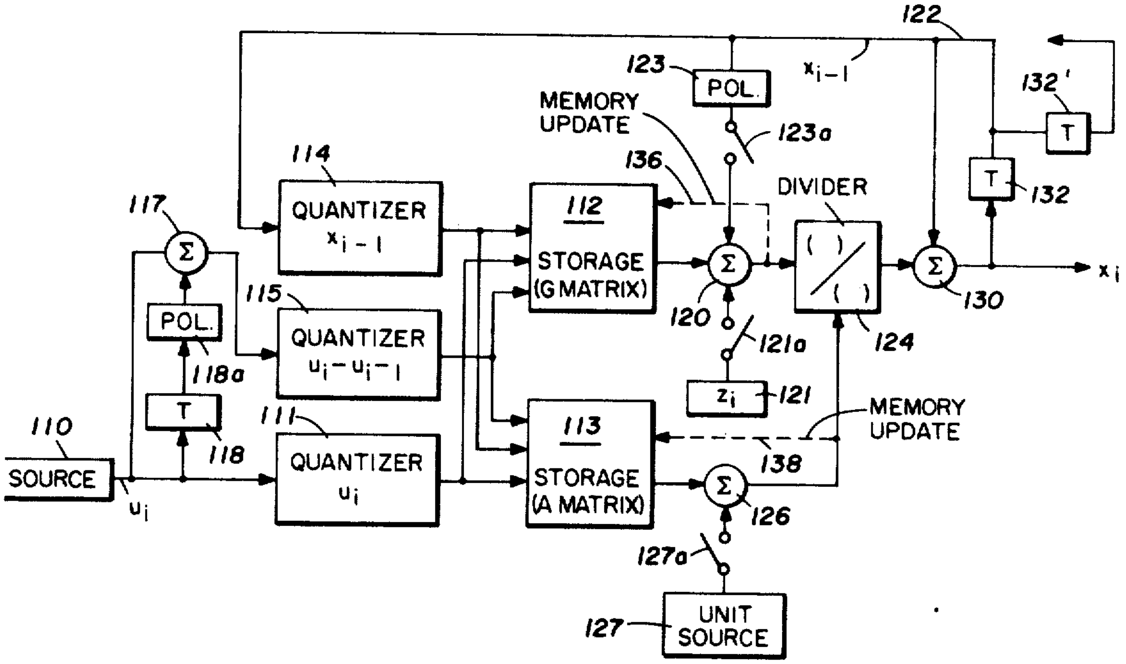
FIG. 1 is a block diagram of one embodiment of applicants' prior system to which the present invention is related.

In FIG. 1 the first component of signal $u$ from a source 110 forms the input to a quantizer 111. The output of quantizer 111 is connected to each of a pair of storage units 112 and 113. The storage units 112 and 113 will in general have like capabilities and will both be jointly addressed by signals in the output circuits of the quantizer 111 and quantizers 114 and 115 and may indeed be a simple storage unit with additional word storage capacity. The storage units 112 and 113 are multielement storage units capable of storing different electrical quantities at a plurality of different addressable storage locations, either digital or analog, but preferably digital. Unit 112 has been given a generic designation in FIG. 1 of "G MATRIX" and unit 113 has been designated as an "A MATRIX." As in application Ser. No. 732,152, the trained responses of the processor are obtained by dividing G values stored in unit 112 by corresponding A values stored in unit 113.

The third quantizer 115 has been illustrated also addressing both storage units 112 and 113 in accordance with the second component of the signal $u$ derived from source 110, the delay 118 and the inversion unit 118a. More particularly, if the signal sample $u_i$ is the contemporary value of the signal from source 110, then the input applied to quantizer 115 is $u_i - u_{i-1}$. This input is produced by applying to a summing unit 117 $u_i$ and the negative of the same signal delayed by one sample increment by the delay unit 118. For such an input, the storage units 112 and 113 may be regarded as three dimensional matrices of storage elements. In the description of FIG. 1 which immediately follows, the quantizer 115 will be ignored and will be referred to later.

The output of storage unit 112 is connected to an adder 120 along with the output of a unit 121 which is a signal $z_i$, the contemporary value of the desired output signal. A third input is connected to the adder 120 from a feedback channel 122, the latter being connected through an inverting unit 123 which changes the sign of the signal.

The output of adder 120 is connected to a divider 124 to apply a dividend signal thereto.

The divisor is derived from storage unit 113 whose output is connected to an adder 126. A unit amplitude source 127 is also connected at its output to adder 126. The output of adder 126 is connected to the divider 124 to apply the divisor signal thereto. A signal representative of the quotient is then connected to an adder 130, the output of which is contemporary value $x_i$ the processor output. The adder 130 also has a second input derived from the feedback channel 122. The feedback channel 122 transmits the processor output signal $x_i$ delayed by one unit time interval in the delay unit 132, i.e., $x_{i-1}$. This feedback channel is also connected to the input of the quantizer 114 to supply the input signal thereto.

A storage input channel 136 leading from the output of adder 120 to the storage unit 112 is provided to update the storage unit 112. Similarly, a second storage input channel 138 leading from the output of adder 126 is connected to storage unit 113 and employed to update memory 113.

During the training phase, neglecting the presence of quantizer 115, the system operates as will now be described. The contemporary value $u_i$ of the signal $u$ from source 110 is quantized in unit 111 simultaneously with quantization of the preceding output signal $x_{i-1}$ (which may initially be zero) by quantizer 114. The latter signal is provided at the output of delay unit 132 whose input-output functions may be related as follows:

$T$ is the delay in seconds, $x_i = x(iT + t_o)$, and $x_{i-1} = x[(i-1)T + t_o]$, where $i$ is an integer, $T$ is the sampling interval, and $t_o$ is the time of the initial sample. The two signals thus produced by quantizers 111 and 114 are applied to both storage units 112 and 113 to select in each unit a given storage cell. Stored in the selected cell in unit 112 is a signal representative of previous value of the output of adder 120 as applied to this cell by channel 136. Stored in the corresponding cell in unit 113 is a condition representative of the number of times that that cell has previously been addressed, the contents being supplied by way of channel 138. Initially all signals stored in both units 112 and 113 will be zero. The selected stored signals derived from storage array 112 are applied synchronously to adder 120 along with $z_i$ and $-x_{i-1}$ signals.

The contemporary output of adder 120 is divided by the output of adder 126 and the quotient is summed with $x_{i-1}$ in adder 130 to produce the contemporary processor response $x_i$. The contemporary value $x_i$ is dependent on the contemporary value $u_i$ of $u$, the contemporary value $z_i$ of the desired output $z$ and negative of $x_{i-1}$, i.e.: $(-x_{i-1})$ as well as the signals from the addressed storage cells.

FIG. 1—EXECUTION PHASE

The system shown in FIG. 1 establishes conditions which represent the optimum nonlinear processor for treating signals having the same statistics as the training functions $[u(t), z(t)]$ upon which the training is based.

After the system has been trained based upon the desired output $z$ over a statistically significant sequence of $u$ and $z$, the switches 121a, 123aand 127a may then be opened and a new input signal $u'$ employed whereupon the processor operates optimally on the signal $u'$ in the same manner as above described but with the three signals $z_i$, $x_{i-1}$ and unity no longer employed within the update channels. Accordingly, storage units 112 and 113 are not updated.

In the system as shown in FIG. 1, quantizer 115 provides an output dependent upon the differences between sequential samples $u_i$ and $u_{i-1}$, employing a delay unit 118 and a polarity reversal unit 118a. In this system a single delay unit 118 is provided at the input and a single delay unit 132 is provided at the output. In general, more delays could be employed on both input and output suggested by 132' shown in FIG. 1. In use of the system with quantizer 115, storage units 112 and 113 may conveniently be regarded as three dimensional. Of course, elements of the input vector and output vector are, in general, not constrained to be related by simple time delays, as for this example and, more generally, the feedback component may relate to the state of the system at $t_{i-1}$ rather than to a physical output derived therefrom. The approach used in FIG. 1 effectively reduces the number of inputs required through the utilization of the feedback signal, hence generally affords a drastic reduction in complexity for comparable performance. Despite this fact, information storage and retrieval can remain a critical obstacle in the practical employment of processors in many applications.

The trained responses can be stored in random access memory at locations specified by the keys, that is, the key can be used as the address in the memory at which the appropriate trained response is stored. Such a storage procedure is called direct addressing since the trained response is directly accessed. However, direct addressing often makes very poor use of the memory because storage must be reserved for all possible keys whereas only a few keys may be generated in a specific problem. For example, the number of storage cells required to store all English words of 10 or less, using direct addressing, is $26^{10} > 100,000,000,000,000$. Yet *Webster's New Collegiate Dictionary* contains fewer than 100,000 entries. Therefore, less than 0.000 000 1 percent of the storage that must be allocated for direct addressing would be utilized. In practice, it is found that this phenomenon carries over to many applications of trainable processors: Much of the storage dedicated to training is never used. Furthermore, the mere necessity of allocating storage on an a priori basis precludes a number of important applications because the memory required greatly exceeds that which can be supplied.

The present invention is directed toward minimizing the storage required for training and operating systems of trainable optimal signal processors wherein storage is not dedicated a priori as in direct addressing but is on a first come, first served basis. This is achieved by removing the restriction of direct addressing that an absolute relationship exists between the key and the location in storage of the corresponding trained response.

In an effort to implement direct addressing, the number of key combinations can be reduced by restricting the dynamic range of the quantizers or decreasing the quantizer resolution as used in FIG. 1. For a fixed input range increasing resolution produces more possible distinct keys and likewise for a fixed resolution increased dynamic range produces more keys. Thus with direct addressing these considerations make some applications operable only with sacrificed performance due to coarse quantization, restricted dynamic range, or both. However, when using the tree allocation procedure disclosed in this invention, memory is used only as needed. Therefore, quantizer dynamic range and resolution are no longer predominated by storage considerations.

In practice quantization can be made as fine as desired subject to the constraints that as resolution becomes finer more training is required to achieve an adequate representation of the training functions and more memory is required to store the trained responses. Thus, resolution is made consistent with the amount of training one wishes or has the means to employ and the memory available.

PROCESSOR TREE STORAGE

The storage method of the present invention which overcomes the disadvantages of direct addressing is related to those operations in which tree structures are employed for the allocation and processing of information files. An operation based upon a tree structure is described by Sussenguth, Jr., Communications of the ACM, Vol. 6, No. V, May 1963, page 272, et seq.

Training functions are generated for the purpose of training a trainable processor. Form such training functions are derived a set of key functions and for each unique value thereof a trained response is determined. The key functions and associated training responses are stored as items of a tree allocated file. Since key functions which do not occur are not allocated, storage is employed only an "as needed" basis.

More particularly, the sets of quantizer outputs in FIG. 1 define the key function. For the purpose of the tree allocation, the key is decomposed into components called *key components*. A natural decomposition is to associate a key component with the output of a particular quantizer, although this choice is not fundamental. Further, it will be seen that each key component is associated with a level in the tree structure. Therefore, all levels of the tree are essential to represent a key. The term "level" and other needed terminology will be introduced hereafter.

In the setting of the processors considered herein, the association of a key with a trained response is called an *item*, the basic unit of information to be stored. A collection of one or more items constitutes a *file*. The key serves to distinguish the items of a file. What remains of an item when the key is removed is often called the function of the item, although for the purposes here the term trained response is more descriptive.

A graph comprises a set of nodes and a set of unilateral associations specified between pairs of nodes. If node $i$ is associated with node $j$, the association is called a branch from initial node $i$ to terminal node $j$. A path is a sequence of branches such that the terminal node of each branch coincides with the initial node of the succeeding branch. Node $j$ is reachable from node $i$ if there is a path from node $i$ to node $j$. The number of branches in a path is the length of the path. A circuit is a path in which the initial node coincides with the terminal node.

A tree is a graph which contains no circuits and has at most one branch entering each node. A root of a tree is a node which has no branches entering it, and a leaf is a node which has no branches leaving it. A root is said to lie on the first level of the tree, and a node which lies at the end of a path of length $(j-1)$ from a root is on the $j^{th}$ level. When all leaves of a tree lie at only one level, it is meaningful to speak of this as the leaf level. Such uniform trees have been found widely useful and, for simplicity, are solely considered herein. It should be noted, however, that nonuniform trees may be accommodated as they have important applications in optimum nonlinear processing. The set of nodes which lie at the end of a path of length one from node $x$ comprises the filial set of node $x$, and $x$ is the parent node of that set. A set of nodes reachable from node $x$ is said to be governed by $x$ and comprises the nodes of the subtree rooted at $x$. A chain is a tree, or subtree, which has at most one branch leaving each node.

In the present system, a node is realized by a portion of storage consisting of at least two components, a node value and an address component designated ADP. The value serves to distinguish a node from all other nodes of the filial set of which it is a member. The value corresponds directly with the key component which is associated with the level of the node. The ADP component serves to identify the location in memory of another node belonging to the same filial set. All nodes of a filial set are linked together by means of their ADP components. These linkages commonly take the form of a "chain" of nodes constituting a filial set. Then it is meaningful to consider the first member of the chain the entry node and the last member the terminal node. The terminal node may be identified by a distinctive property of its ADP. In addition, a node may commonly contain an address component ADF plus other information. The ADF links a given node to its filial set. Since in some applications the ADF linkage can be computed, it is not found in all tree structures.

In operation the nodes of the tree are processed in a sequential manner with each operation in the sequence defining in part a path through the tree which corresponds to the key function and provides access to the appropriate trained response. This sequence of operations in effect searches the tree allocated file to determine if an item corresponding to the particular key function is contained therein. If during training the item cannot be located, the existing tree structure is augmented so as to incorporate the missing item into the file. Every time such a sequence is initiated and completed, the processor is said to have undergone a *training cycle*.

Figure 2:
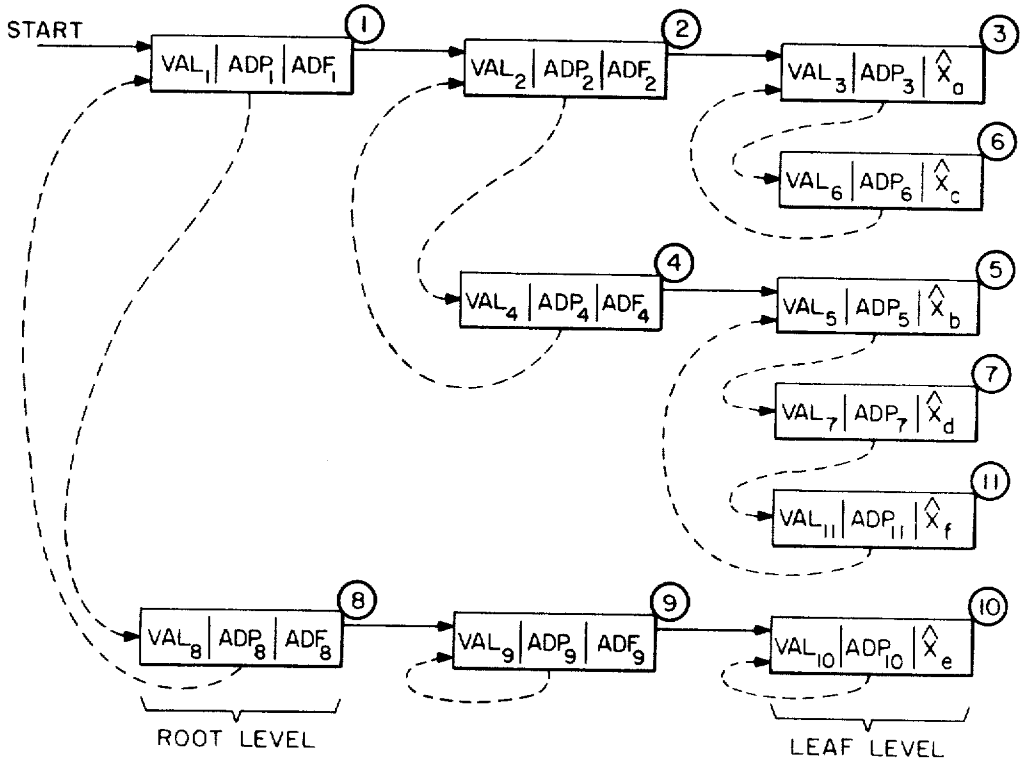
FIG. 2 illustrates schematically a computer representation of a doubly chained tree.

The operations of the training cycle can be made more concrete by considering a specific example. Consider FIG. 2 wherein a tree structure such as could result from training a processor is depicted. The blocks represent the nodes stored in memory. They are partitioned into their value, ADP, and ADF components. The circled number associated with each block identifies the node and corresponds to the location (or locations) of the node in memory. As discussed, the ADP of a node links it to another node within the same filial set and ADF links it to a node of its filial set at the next level of the tree. For example, in FIG. 2, $ADP_1$ links node 1 to node 8 and $ADF_1$ links node 1 to node 2. For clarity the ADP linkages between nodes are designated with dashed lines whereas the ADF linkages are designated with solid lines. In FIG. 2 the trained responses are stored in lieu of ADF components at the leaf nodes since the leaves have no progeny. Alternatively, the ADF component of the leaves may contain the address at which the trained response is stored. In this setting the system inputs are quantizer outputs and are compared with a node value stored at the appropriate level of the tree.

When the node value matches a quantizer output, the node is said to be selected and operation progresses via the ADF to the next level of the tree. If the value and quantizer output do not match, the node is tested, generally by testing the ADP, to determine if other nodes exist within the set which have not been considered in the current search operation. If additional nodes exist, transfer is effected to the node specified by the ADP and the value of that node is compared with the quantizer output. Otherwise, a node is created and linked to the set by the ADP of what previously was the terminal node. The created node, which becomes the new terminal node, is given a value equal to the quantizer output, and ADP component indicating termination, and an ADF which initiates a chain of nodes through the leaf node.

When transfer is effected to the succeeding level, the operations performed are identical to those just described provided the leaf level has not been reached. At the leaf level if a match is obtained, the trained response can be accessed as a node component or its address can be derived from this component.

A typical operation of this type can be observed in FIG. 2 in which the operations of the training cycle begin at node 1 where the first component of the key is compared with $VAL_1$. If said component does not match $VAL_1$, the value of $ADP_1$ (= 8) is read and operation shifts to node 8 where the component is compared with $VAL_8$. If said component does not match $VAL_8$, the value of $ADP_8$ is changed to the address of the next available location in memory (12 in the example of FIG. 2) and new tree structure is added with the assigned value of the new node being equal to the first key component. Operations within a single level whereby a node is selected or added is termed a *level iteration*. The first level iteration is completed when either a node of the first level is selected or a new one added. Assume $VAL_1$ matches the first component of the key. Operation is then transferred to the node whose address is given by $ADF_1$ (= 2). At level two, $VAL_2$ will be compared with the second component of the key with operation progressing either to node 3 or node 4 depending upon whether $VAL_2$ and said key component match. Operation progresses in this manner until a trained response is located at the leaf level, and new roof generated.

Note in FIG. 2 that the node location specified by the ADF is always one greater than the location containing the ADF. Clearly, in this situation the ADF is superfluous and may be omitted to conserve storage. However, all situations do not admit to this or any other simple relationship, whence storage must be allotted to an ADF component. By way of example for such necessity, copending application Ser. No. 889143, filed Dec. 30, 1969, and entitled "Probability Sort In A Storage Minimized Optimum Processor", discloses such a need. For simplicity, only those situations in which the ADF can be obtained according to the above rule will be detailed herein.

Training progresses in the above manner with each new key function generating a path through the tree defining a leaf node at which the trained response is stored. All subsequent repeated keys serve to locate and update the appropriate trained response. During training the failure to match a node value with the output of the corresponding quantizer serves to instigate the allocation of new tree storage to accommodate the new information. In execution, such conditions would be termed an *untrained point*. This term derives from the fact that none of the keys stored in training matches the one under test during execution.

Figure 11:
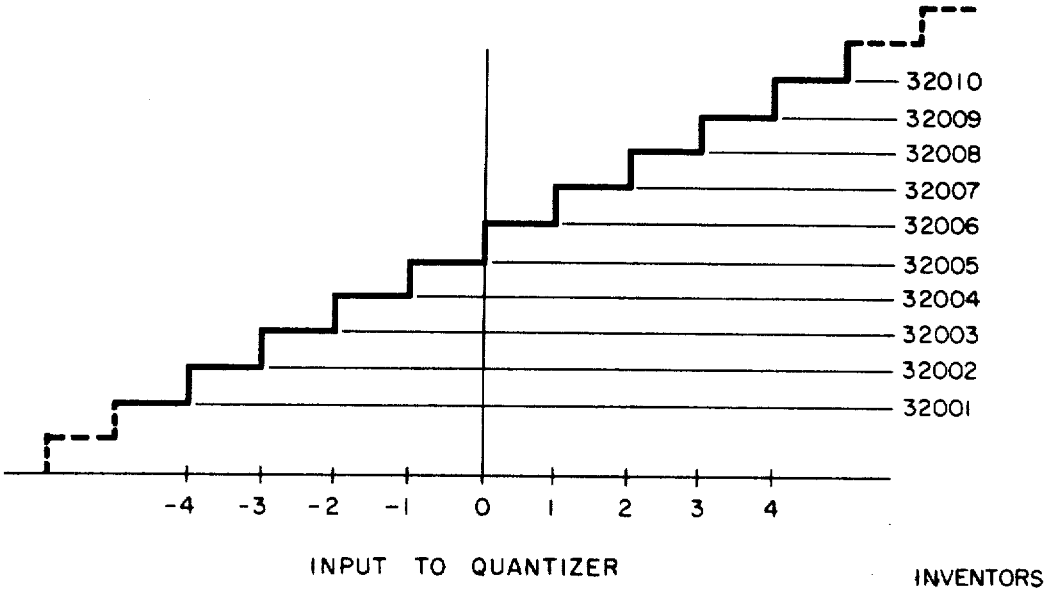
FIG. 11 illustrates the technique of "infinite quantization" employed in the system of FIGS. 5–8.

As discussed previously, when the tree allocation procedure is used, the numerical magnitude of a particular node value is independent of the location or locations in memory at which the node is stored. This provides a good deal of flexibility in assigning convenient numerical magnitudes to the quantizer outputs. As is shown in FIG. 11, the numbers in the region of 320000 were selected as quantizer outputs to emphasize the independence of the actual magnitude of quantizer outputs and because they corresponded to half of the dynamic range provided by the number of bits of storage of the ADP field of the nodes. Thus, as seen in FIG. 11, if the input to a quantizer is between 0 and 1, the output of said quantizer is 32006. Any other magnitude would have served equally well. The resolution can be increased or decreased by changing the horizontal scale so that the input range which corresponds to a given quantizer value is changed. For example, if the scale is doubled, any input between 0 and 2 would produce 32006, any input between 2 and 4 would yield 32007, etc., so that resolution has been halved. Likewise, the quantizer ranges can be nonuniform as evidenced by nonuniform spacing on the horizontal scale thus achieving variable resolution as might be desirable for some applications.

Another benefit to be realized from the lattitude of the quantizations of FIG. 11 is that the range of the input variables does not need to be known a priori since a wide range of node values can be accommodated by the storage afforded by the VAL field. If the input signal has wide variations, the appropriate output values will be generated. The dashed lines in FIG. 11 imply that the input signal can assume large positive and negative values without changing the operating principle. In effect, the quantizers behave as though they have infinite range. This arrangement is referred to as "infinite quantizing." While the numerical value from the quantizer is not critical, it still must be considered because the larger the number, the more bits of memory will be required to represent it. Therefore, in applications where storage is limited, the output scales of FIG. 11 might be altered.

With the above general discussion of the operation and advantages of the tree storage techniques, the details of FIGS. 3–10 will now be presented.

Figure 3:
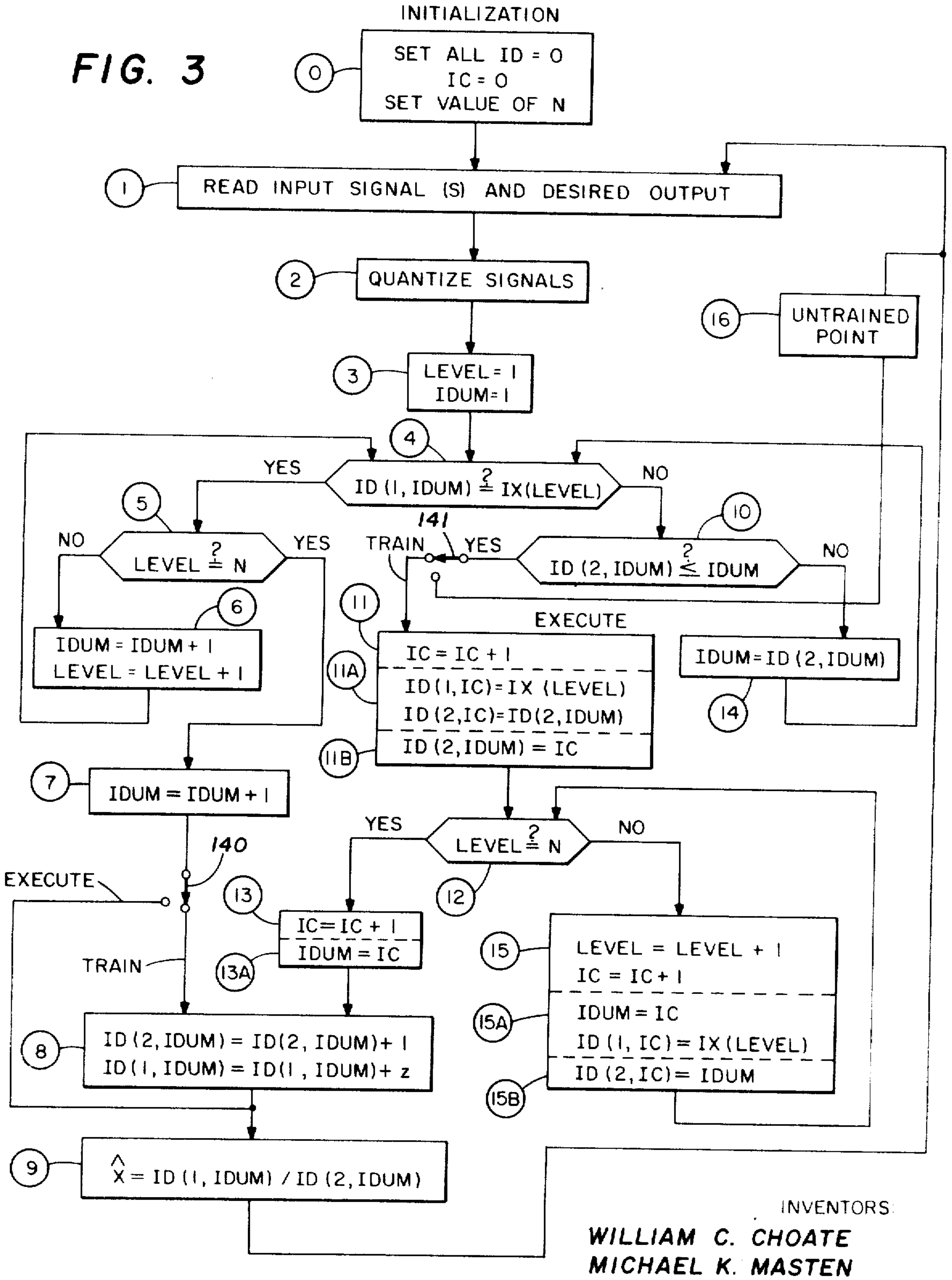
FIG. 3 is a generalized flow diagram illustrating an optimum processor in which storage is utilized only as needed.
Figure 4:
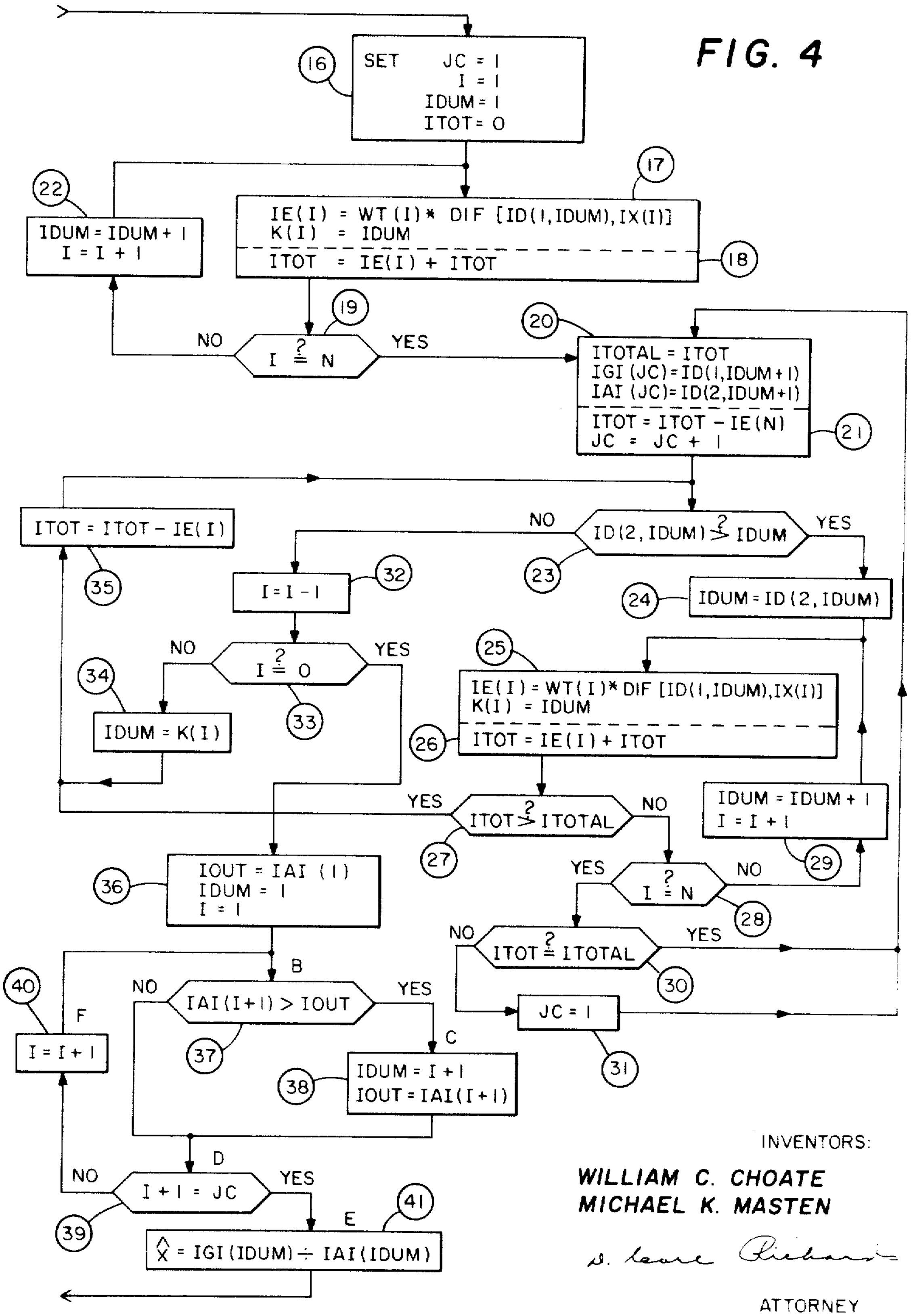
FIG. 4 is a generalized flow diagram illustrating an operation where, during execution, an untrained point is encountered.

FIGS. 3 and 4

The present system employs a basic tree storage structure and use thereof with what may be termed infinite quantization of the inputs in a trainable nonlinear data processor. FIGS. 3 and 4 illustrate a generalized flow diagram in accordance with which multi-input operation may be first trained and then, after training, utilized for processing signals. The operations of FIG. 3 are generally concerned with training followed by execution on the trained responses thus produced. The operations of FIG. 4 are concerned with execution when an untrained point is encountered. It will be understood that FIG. 3 is one of many ways to implement a tree type storage procedure. FIG. 4 illustrates an expanded search procedure.

The flow diagram applies both to operations on a general purpose digital computer or on a special purpose computer illustrated in FIGS. 5–10. In FIGS. 3 and 4 control states 0–41 are assigned to the operations required in the flow diagram. In the state shown, the flow diagram of FIG. 3 is applicable to a training operation. With switches 140 and 141 changed to the normally open terminals, the flow diagrams are representative of the operation of the processor once trained.

The legends set out in FIGS. 3 and 4 will best be understood by reference to the specific two input feedback example illustrated in FIGS. 5–10. Briefly, however, the following legends used in FIGS. 3 and 4 are employed in FIGS. 5-10.

Signal $u_t$ is the input signal which is a single valued function of time and is used for training purposes. Subsequent signals $u_t$ may then be used in execution after training is completed.

Signal $Z_t$ is the desired response of the processor to the input signal $u_t$ and is used only during training. Signal $X_{t-1}$ is a response of the processor at time $t_{t-1}$, to $u_{t-1}$ and $x_{t-2}$, etc. Signal $I_{x_1}$ is the quantized value of the input $u_t$ and signal $I_{x_2}$ is the quantized value of the feedback component $x_{t-1}$, and so constitute the keys for this example. ID1 is a term by which a register 184, FIG. 6, will be identified herein. ID1 register 184 will serve for separate storage of key components as well as elements of a G matrix. The address in register 184 will be specified by the legend ID(1,–) where information represented by the blank will be provided during the operation and is the node identification (number). Node values are the key component IX values and form part of the information representing each node in the storage tree.

The other part of the information representing a node is an ADP signal which is a word in storage indicating whether or not there is an address previously established in the tree to which the search shall proceed if the stored node value does not match the corresponding quantizer output at that node. Further, the ADP signal is such address.

Figure 6:
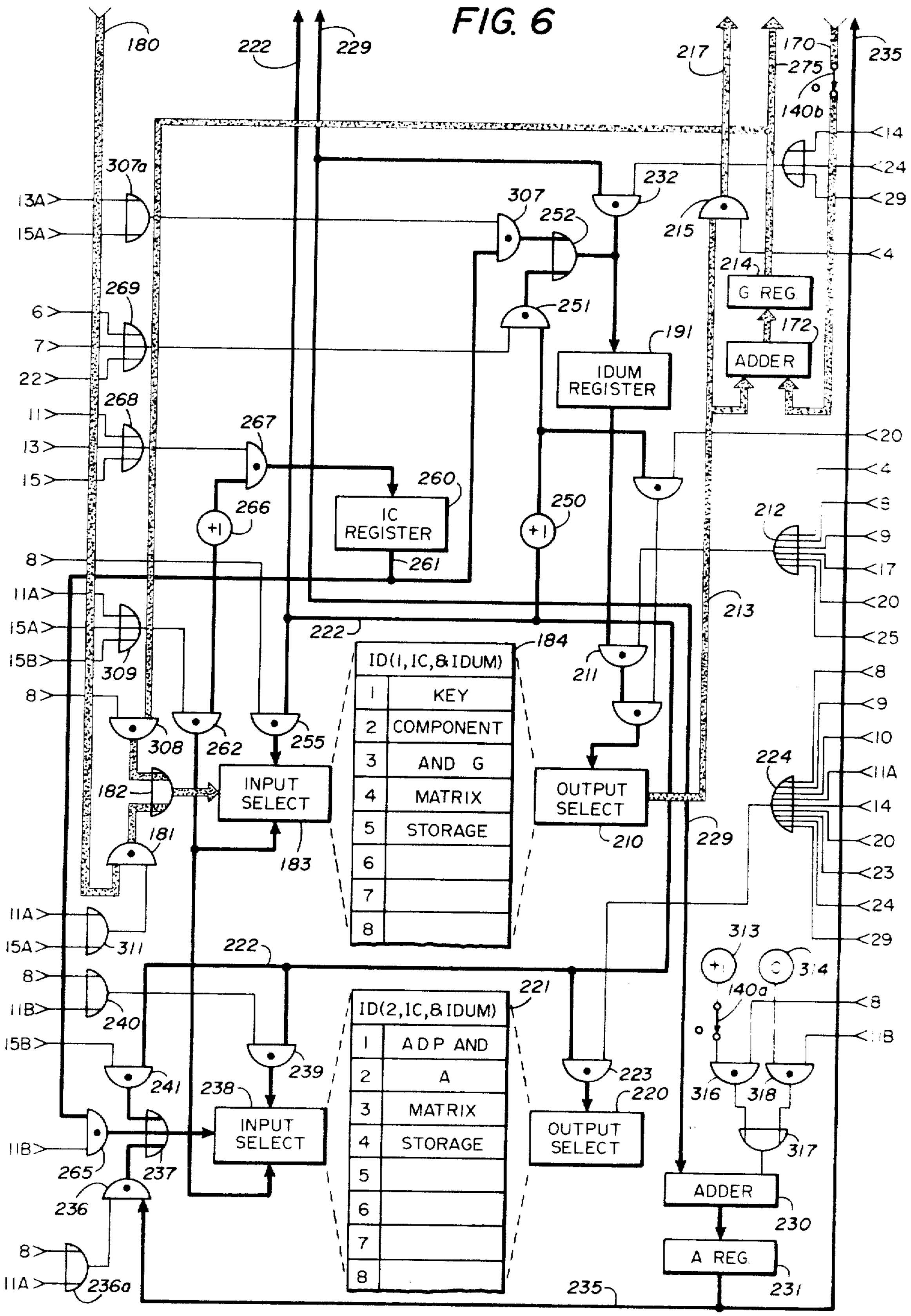

An ID2 register 221, FIG. 6, will serve for storage of the ADP signals as well as elements of the A matrix. The address in register 221 will be specified by the legend ID(2,_) where information represented by the blank is the node identification (number). Thus, ID2 is a term by which storage register 221 will be identified. IDUM refers to the contents stored in an incrementing dummy register and is used to signify the node identification at any instant during operation. N register It will be noted that the input of adder 230, FIG. 6, is controlled from a unit source 313 or a zero state source 314. The unit source 313 is connected by way of a switch 140*a* and a gate 316 to OR gate 317 which leads to the second input of the adder 230. The gate 316 is actuated under suitable control. The zero state source 314 is connected by way of gate 318 leading by way of OR gate 317 to the adder 230. Gate 318 similarly is actuated under suitable control. Switch 140*a* is in position shown during training.

Referring again to FIG. 3, it will be seen that control states 0–16 have been designated. The control states labeled in FIG. 3 correspond with the controls to which reference has been made heretofore relative to FIGS. 5 and 6. The control lines upon which the control state voltages appear are labeled on the margins of the drawing of FIGS. 5 and 6 to conform with the control states noted on FIG. 3.

FIGS. 7 AND 8

Figure 7:
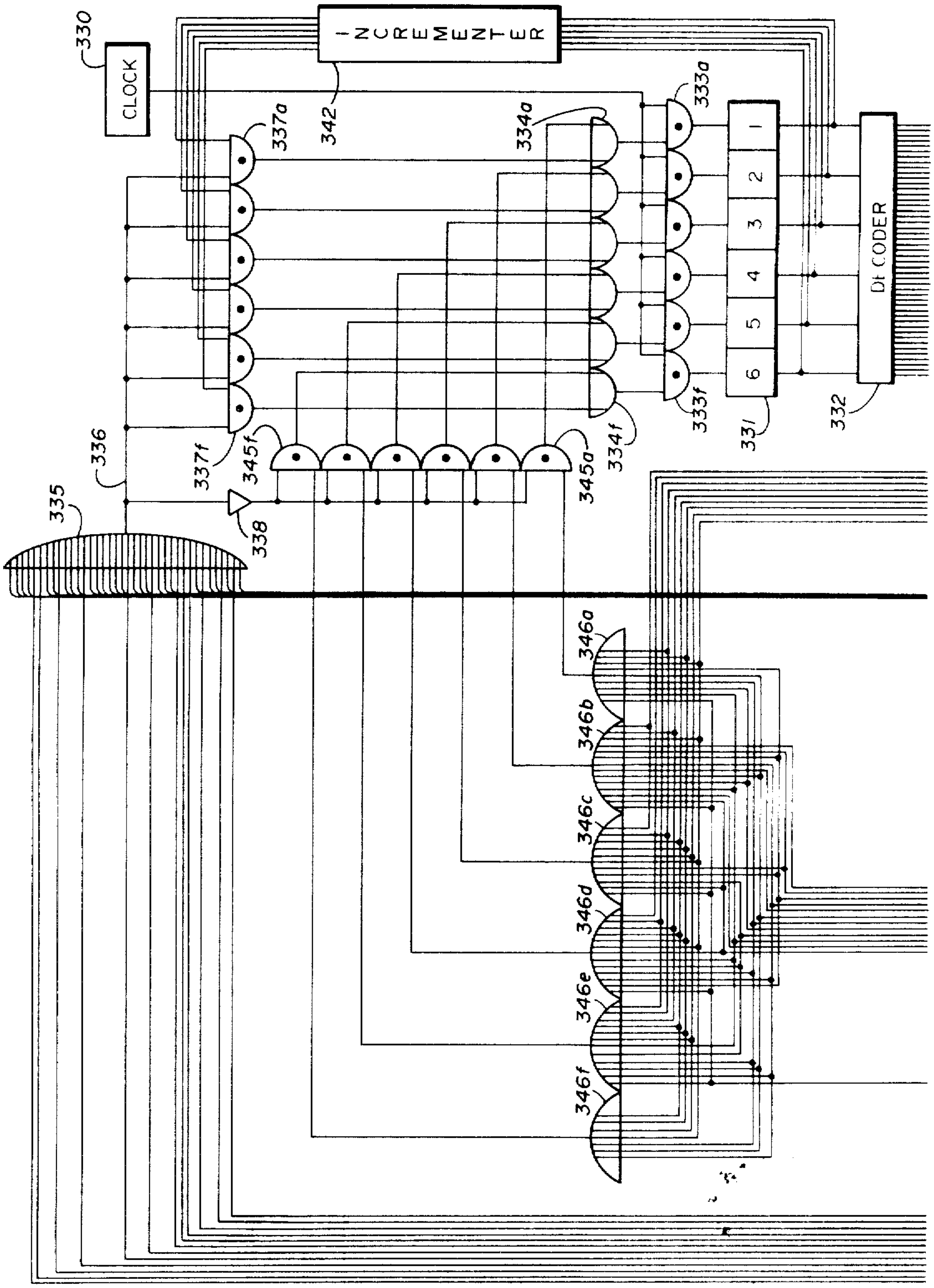

The control state voltages employed in FIGS. 5, 6, 9 and 10 are produced in response to a clock 330, FIG. 7, which is connected to a counter 331 by way of line 332. Counter 331 is connected to a decoder 332 which has an output line for each of the states 0–41. The control states are then applied by way of the lines labeled at the lower right hand portion of FIG. 7 to the various input terminals correspondingly labeled on FIGS. 5 and 6 as well as FIGS. 9 and 10 yet to be described.

It will be noted that the counter 331 is connected to and incremented by clock 330 by way of a bank of AND gates 333*a–f*, one input of each of gates 333*a–f* being connected directly to the clock 330. The other input to each of gates 333*a–f* is connected to an output of a gate in the bank of OR gates 334*a–f*. Or gates 334*a–f* are controlled by AND gates 337*a–f* or by AND gates 345*a–f*. The incrementer together with the output of OR gate 335 jointly serve to increment the counter 331 one step at a time. The AND gates 345*a–f* are employed wherein a change in the count in counter 331 other than an increment is called for by the operation set forth in FIGS. 3 and 4.

Counter 331 is decoded in well known manner by decoder 332. By this means, the control states 0–41 normally would appear in sequence at the output of decoder 332. Control lines for 0, 1, 2, 3, 7, 8, 11, 11A, 11B, 13, 15, 15A, 16–18, 20–22, 24–26, 32, 34, 36, 38 and 40 are connected to OR gate 335. The output of OR gate 335 is connected by way of line 336 to each of gates 337*a–f*. As above noted, the second input to gates 337*a–f* are supplied by way of an incrementer 342.

The output of gate 335 is also connected by an inverter unit 338 to one input of each of gates 345*a–f*. The second input of the gates 345*a–f* are supplied from logic leading from the comparators of FIGS, 5, 9 and 10 and from the decode unit 333.

Gates 345*a–f* have one input each by way of a line leading from inverter 338 which is ANDed with the outputs from OR gates 346*a–f*. Gates 346*a–f* are provided under suitable control such that the required divergences from a uniform sequence in generation of control states 0–41 is accommodated. It will be noted that control states 6, 9, 13A, 14, 15B, 29, 31, 35 and 41 are connected directly to selected ones of gates 346*a–f*.

By reference to FIGS. 3 and 4 it will be noted that on the latter control states there is an unconditional jump. In contrast, it will be noted that control states 4, 5, 10, 12, 19, 23, 27, 28, 30, 33, 37 and 39 are applied to logic means whose outputs are selectively applied to OR gates 346*a–f* and to OR gate 335. More particularly, control state 4 is applied to gates 347*a* and 348*a*; control state 5 is applied to gates 347*b* and 348*b*; control state 10 is applied to AND gates 347*c* and 348*c*; control state 12 is applied to AND gates 347*d* and 348*d*; control state 19 is applied to AND gates 347*e* and 348*e*; control state 23 is applied to AND gates 347*f* and 348*f*; control state 27 is applied to AND gates 347*g* and 348*g*; control state 28 is applied to AND gates 347*h* and 348*h*; control state 30 is applied to AND gates 347and 348*i*; control state 33 is applied to AND gates 347*j* and 348*j*; control state 37 is applied to AND gates 347*k* and 348*k*; and control state 39 is applied to AND gates 347*m* and 348*m*.

The outputs of AND gates 347*a–m* are selectively connected to OR gates 346*a–f* in accordance with the Schedule A (below) whereas AND gates 348*a–m* are connected to OR gate 335. The second input to each of gates 347*a –m* and to gates 348*a–m* are derived from comparators of FIGS. 5, 9 and 10 as will later be described, all consistent with Schedule A.

SCHEDULE A (Schedule of logic connections to OR gates 346a–f and 335.)

| Present Control State | Condition | Next Control State | Bit Changed For Shift |
|---|---|---|---|
| 4 | yes | 5 | |
| | no | 10 | 2,3,4 |
| 5 | yes | 7 | 2 |
| | no | 6 | |
| 6 | — | 4 | 2,3 |
| 9 | — | 1 | 4 |
| 10 | yes | 11 | |
| | no | 14 | 1,2,4,5 |
| 12 | yes | 13 | 3,4,5 |
| | no | 15 | |
| 13A | — | 8 | 4,5 |
| 14 | — | 4 | 1,3,5 |
| 15B | — | 12 | 2,4,5 |
| 10 | yes | 16 | 1,2,3,4,5 |
| 19 | yes | 20 | |
| | no | 22 | 1,2 |
| 23 | yes | 24 | |
| | no | 32 | 1,4,5,6 |
| 27 | yes | 35 | 1,2,5,6 |
| | no | 28 | |
| 28 | yes | 30 | 2 |
| | no | 29 | |
| 29 | — | 25 | 3,4,5,6 |
| 30 | yes | 20 | 2,4,5,6 |
| | no | 31 | |
| 31 | — | 20 | 1,3,4,5,6 |
| 33 | yes | 36 | 1,2,3,4 |
| | no | 34 | |
| 35 | — | 23 | 3,5,6 |
| 37 | yes | 38 | |
| | no | 39 | 2,3 |
| 39 | yes | 41 | 2 |
| | no | 40 | |
| 41 | — | 1 | 1,2,3,4,6 |

It will be noted that control state 10 is applied to gate 348*c* by way of switch 141. In the position shown in FIG. 7 switch 141 is set for a training operation. Thus, on control state 10 if the comparison is true, then the operation increments from control state 10 to control state 11. However, in execution if the comparison in control state 10 is true, then the operation skips from control state 10 to control state 16. This signifies, in execution, that all of the stored values have been interrogated and it has been found that the contemporary set of execution input signals were not encountered during training so that the system is attempting to execute on an untrained point. It is at this point that the system of FIGS. 9 and 10 are considered to permit continued operation in a preferred manner when an untrained point is encountered during execution as will later be described.

Figure 5:
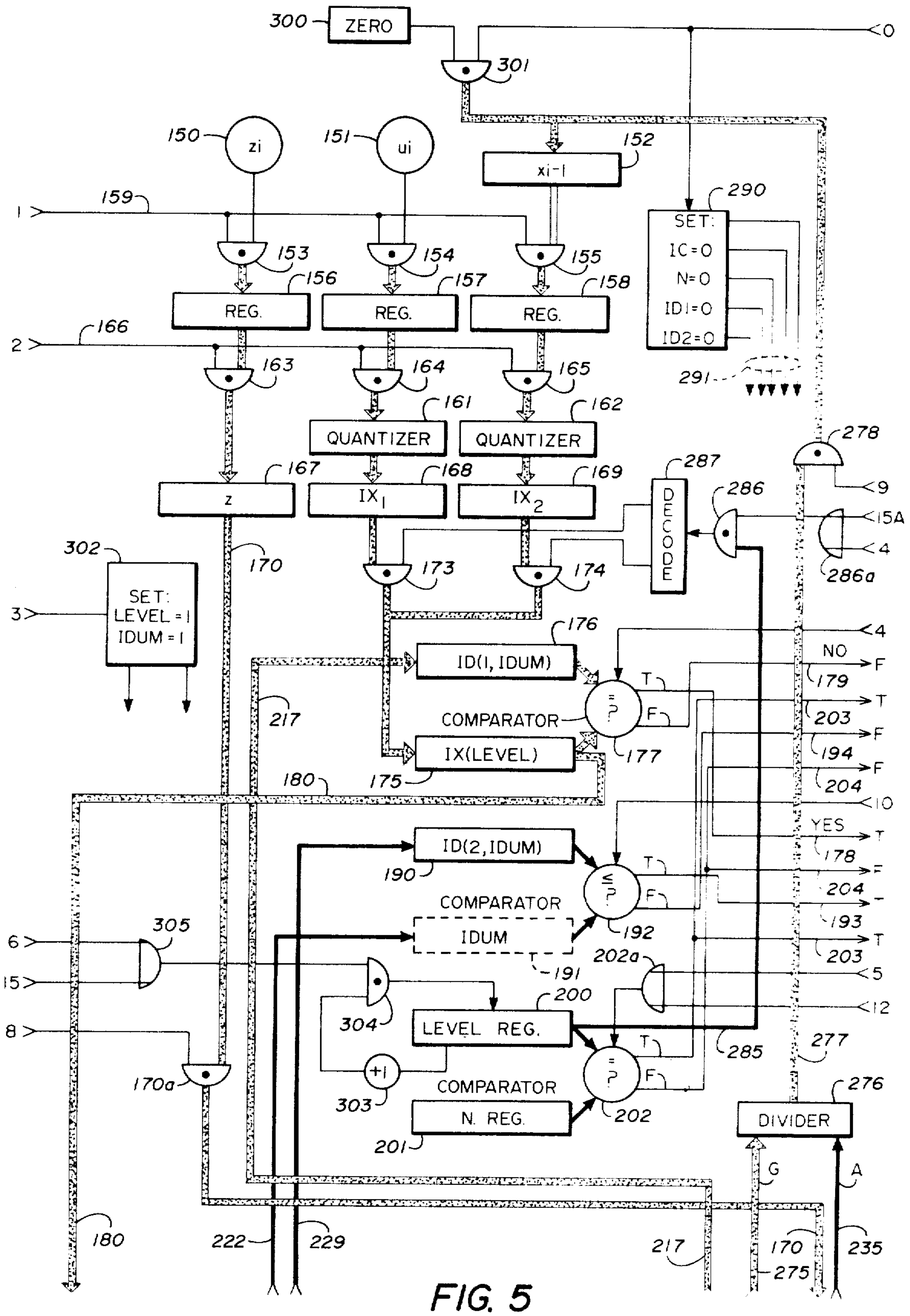
FIGS. 5–10 illustrate a special purpose tree structured digital processor.

It will be noted that lines 178, 179, 204, 203, 193 and 194 are output lines leading from comparators 177, 192, and 202, FIG. 5. Lines 361, 362, 411, 412, 372, 371, 282, 281, 352, 351, 401, 402, 392, 391 appearing at the lower left side of FIG. 7 are output lines leading from the comparators 350, 360, 370, 380, 390, 400 and 410 of FIG. 10. The comparisons of Schedule A together with the connections indicated in FIGS. 7 and 8 will make clear the manner in which the sequences required in FIGS. 3 and 4 are accomplished through the operation of the system of FIG. 7.

By way of example, it will be noted that, in FIG. 3, on control state 4 comparison is made to see if the quantity ID(1,IDUM) is equal to the quantity IX(LEVEL). If the comparison is true, then the counter 331 increments so that the next control state 5 is produced. If the comparison is false, then the count in counter 331 must shift from 4 to 10. This is is a register preset to the number of inputs. In the specific example of FIGS. 5–10, this is set to 2 since there are two inputs, $u_i$ and $x_{i-1}$. LEVEL is a numerical indication of the level in the tree structure. LEVEL register is a register which stores different values during operation, the value indicating the level of operation within the tree structure at any given time. IC register is a register corresponding to the addresses of the storage locations in ID1 and ID2. G is the trained value of the processor response. A is the number of times a given input set has been encountered in training.

Figure 9:
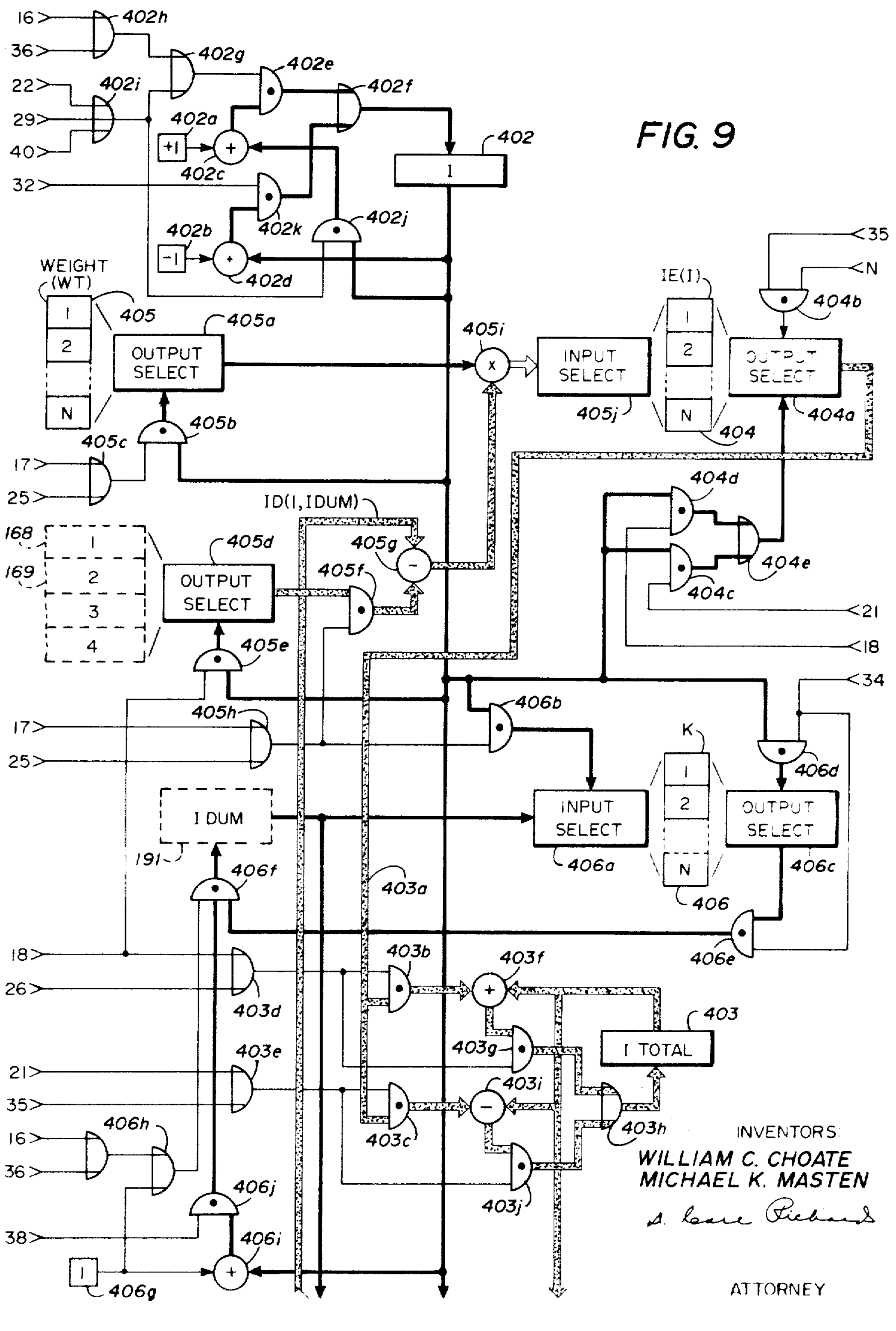
Figure 10:
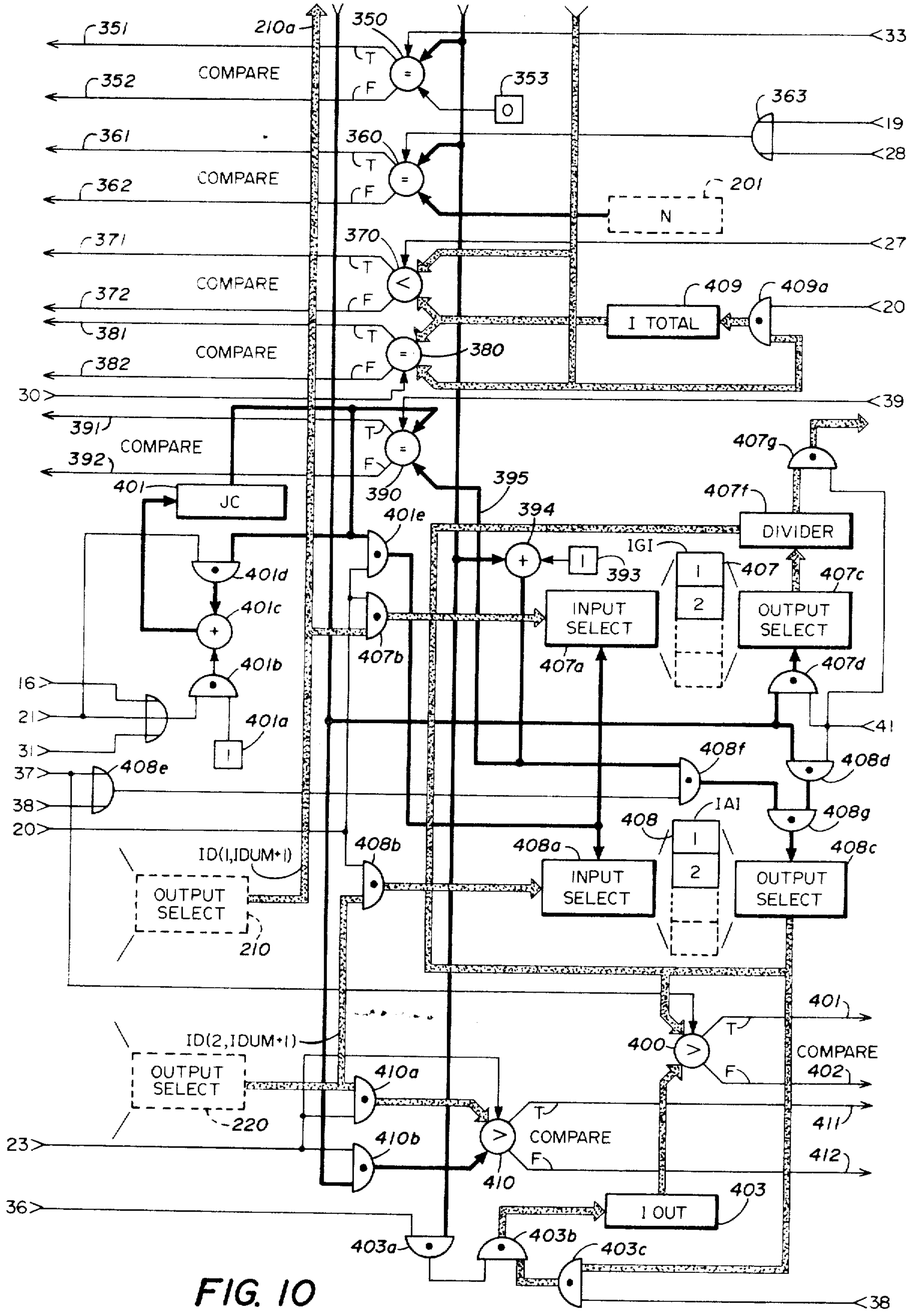

Similarly, in FIGS. 9 and 10 JC register 401, I register 402, ITOT register 403, and ITOTAL register 409 serve to store digital representations of states or controls involved in the operation depicted by the flow chart of FIG. 4, the data being stored therein being in general whole numbers. A set of WT registers 405 store weighting functions which may be preset and which are employed in connection with the operation of FIG. 4. K registers 406 similarly are provided for storing, for selection therefrom, representations related to the information stored in IDUM register 191, FIG. 6. IGI register 407 and IAI register 408 serve to store selected values of the G and A values employed in the operation of FIG. 4. Comparators 350, 360, 370, 380, 390, 400 and 410 are also basic elements in the circuit of FIGS. 9 and 10 for carrying out the comparisons set forth in FIG. 4.

FIGS. 5 AND 6

Refer first for FIGS. 5 and 6 which are a part of a special purpose computer comprised of FIGS 5–10. The computer is a special purpose digital computer provided to be trained and then to operate on input signal $u_i$ from source 151. The desired response of the system to the source $u_i$ is signified as signal $z_i$ from source 150. The second signal input to the system, $x_{1-1}$, is supplied by way of register 152 which is in a feedback path.

Samples of the signals from sources 150 and 151 are gated, along with the value in register 152, into registers 156–158, respectively, by way of gates 153–155 in response to a gate signal on control line 159. Line 159 leads from the control unit of FIG. 7 later to be described and is identified as involving control state 1. Digital representations of the input signals $u_i$ and $x_{i-1}$ are stored in registers 157 and 158 and are then gated into quantizers 161 and 162 by way of gates 164 and 165 in response to a gate signal on control line 166. The quantized signals $Lx_1$ and $Lx_2$ are then stored in registers 168 and 169. The desired output signal $z_i$ is transferred from register 156 through gate 163 and is stored in register 167.

The signal $z_i$ from register 167 is applied by way of line 170, gate 170*a*, and switch 140*b* to one input of an adder 172. Switch 140*b* is in position shown during training. The key component signals stored in registers 168 and 169 are selectively gated by way of AND gates 173 and 174 to an IX(LEVEL) register 175. A register 176 is connected along with register 175 to the inputs of a comparator 177. The TRUE output of comparator 177 appears on line 178. The FALSE output of comparator 177 appears on line 179, both of which are connected to gates in the control unit of FIG. 8. The output of the IX(LEVEL) register 175 is connected by way of line 180 and gates 181 and 182 to an input select unit 183. Unit 183 serves to store a signal from OR gate 182 at an address in register 184 specified by the output of gates 255 or 262, as the case may be. A register 190 and an IDUM register 191 are connected at their outputs to a comparator 192. It will be noted that register 191 is shown in FIG. 6 and is indicated in dotted lines in FIG. 5. The TRUE output of comparator 192 is connected by way of line 193 to FIG. 8. The FALSE output is connected by way of line 194 to FIG. 8.

A LEVEL register 200 and N register 201 are connected to a comparator 202. The true output of comparator 202 is connected by way of line 203 to FIG. 8 and the FALSE output of comparator 202 is connected by way of line 204 to FIG. 8.

An output select unit 210 actuated by gate 211 from IDUM register 191 and from OR gate 212 serves to read the G matrix signal (or the key signals) from the address in ID1 register 184 specified by the output of AND gate 211. Output signals read from register 184 are then applied by way of line 213 to the adder 172 at which point the signal extracted from register 184 is added to the desired output signal and the result is then stored in G register 214. The signal on channel 213 is also transmitted by way of gate 215 and line 217 to the input to the comparator register 176.

An output selector unit 220 serves to read signals stored at addresses in the ID2 register 221 specified by an address signal from register 191 appearing on line 222. An address gate 223 for output select unit 220 is controlled by an OR gate 224. The A matrix values (the ADP signals) selected by output selector 220 are then transmitted to an adder 230, the output of which is stored in an A register storage unit 231. The output on line 229 leading from select unit 220 is also transmitted by way of gate 232 to IDUM register 191 and to the input of the comparator register 190. Gate 232 is controlled by a signal on a control line leading from FIG. 8.

The ADP stored in the A register 231 is transmitted by way of line 235, AND gate 236, and OR gate 237 to an input selector unit 238 for storage in the ID2 register 221 under control of OR gate 236*a*. The storage address in input select unit 238 is controlled by way of gate 239 in response to the output of IDUM register 191 as it appears on line 222. Gate 239 is controlled by way of OR gate 240 by control lines leading to FIG. 8. Line 222 also extends to gate 241 which feeds OR gate 237 leading to select unit 238. Line 222 leading from register 191 also is connected by way of an incrementer 250, AND gate 251 and OR gate 252 back to the input of register 191. Line 222 also extends to gate 255 leading to a second address input of the select unit 183. Line 222 also extends to the comparator 192 of FIG. 5.

An IC register 260 is connected by way of its output line 261 and by way of gate 262 to the control input of select units 183 and 238. Line 261 is also connected by way of gate 265 and an OR gate 237 to the data input of the select unit 238. Line 261 is also connected by way of an incrementer 266, AND gate 267 to the input of the register 260 to increment the same under the control of OR gate 268. Incrementing of IDUM register 191 is similarly controlled by OR gate 269.

The G value outputs from register 214 and the A value output from register 231 are transmitted by way of lines 235 and 275 to a divider 276, the output of which is transmitted by way of channel 277 and AND gate 278 to register 152 to provide feedback signal $x_{i-1}$.

The signal in the LEVEL resister 200 is transmitted by way of the channel 285 and the gate 286 to a decoder 287 for selective control of gates 173 and 174.

An initializing unit 290 under suitable control is connected by way of channels 291 to registers IC 260, N 201, ID1 184 and ID2 221 to provide initial settings, the actual connections of channels 291, to IC, N, ID1 and ID2 not being shown. A zero state input from a source 300 is applied by way of AND gate 301 under suitable control to register 152 initially to set the count in register 152 to zero.

A second initializing unit 302 is provided to preset LEVEL register 200 and IDUM register 191.

LEVEL register 200 is connected by way of an incrementer 303 and AND gate 304 to increment the storage in register 200 in response to suitable control applied by way of OR gate 305.

The output of the IC register 260 is also connected by way of gate 307 and OR gate 252 to the input of IDUM register 191, gate 307 being actuated under suitable control voltage applied to OR gate 307*a*.

G register 214 in addition to being connected to divider 276 is also connected by way of line 275 to gate 308 and OR gate 182 to the data input of the select unit 183, gate 308 being actuated under suitable control. Similarly, gate 262 is actuated under suitable control applied by way of OR gate 309. Similarly, gate 181 is actuated under suitable control applied by way of OR gate 311.

accomplished by applying the outputs of comparator 177 to AND gates 348a and 347a. The true output appearing on line 178 is applied to AND gate 348a whose output is connected by way of OR gate 335 and line 336 to the bank of AND gates 347a–f. As a result, the count from clock 330 applied to AND gates 333a–f is merely incremented to a count of 5. However, if the comparison is false, then there is a control state on line 179 leading to AND gate 347a. The output of AND gate 347a is connected to OR gates 346b, 346c, and 346d. This causes AND gates 345b, 345c and 345d to be enabled whereby the count in counter 331 rather than shifting from a count of 4 to a count of 5 shifts from a count of 4 to a count of 10. This is accomplished by altering the second, third and fourth bits of the counter 331 through AND gates 345b, 345c and 345d. Similarly, each of the comparison outputs is employed in accordance with Schedule A so that the sequence as required by FIGS. 2 and 2a will be implemented. Because of the presence of the inverter 338, only one of the two sets of AND gates 337a–f or 345a–f will be effective in control of gates 333a–f through OR gates 334a–f.

OPERATION—TRAINING

In the following example of the operation of the system of FIGS. 5–8, thus far described the values of the input signal $u$ and the desired output signal $z$ that will be employed are set forth in Table I along with a sequence of values of the signal 7 to be used in post-training operations.

TABLE I

| Training Sequence | $u$ | $z$ (Desired output) | Execution Sequence | $u$ |
|---|---|---|---|---|
| 1 | 2.5 | 2 | 1 | 2.3 |
| 2 | 1.5 | 2 | 2 | 1.2 |
| 3 | 1.6 | 1 | 3 | 1.8 |
| 4 | 1.0 | 1 | 4 | 3.5 |
| 5 | 2.3 | 1 | | |
| 6 | 1.0 | 1 | | |
| 7 | 2.3 | 2 | | |

It will be noted that the values of $u$ vary from one sample to another. Operation is such that key components are stored along with G and A values at addresses in the G matrix and in the A matrix such that in execution mode an output corresponding with the desired output will be produced. For example, in execution, it will be desired that every time an input signal sample $u = 2.5$ appears in the unit 151 and a feedback sample $x_{i-1} = 0$ appears in unit 152, FIG. 5, the output of the system will be the optimum output for this input key. Similarly, a desired response will be extracted from the processor for every other input upon which the processor has been trained.

In considering further details of the operation of the system of FIGS. 5–8, it was noted above that the processor may include digitizers in units 156 and 157 which may themselves be termed quantizers. However, in the present system, units 161 and 162, each labeled "quantizer," are used. Quantizers 161 and 162 in this setting serve to change the digitized sample values in registers 157 and 158 to coded values indicated in FIG. 11. Quantizers 161 and 162 thus serve as coarser digitizers and could be eliminated, depending upon system design. By using quantizers 161 and 162, a high or infinite range of signal sample values may be accommodated. As shown in FIG. 11, the quantizers provide output values which are related to input values in accordance with the function illustrated in the graph. In Table I when the discrete time sample of the signal $u = 2.5$, the function stored in the register 168 would be the value 32008. The signal from units 150 and 151 may be analog signals in which case an analog-to-digital converter may be employed so that the digital representation of the signal in any case will be stored in registers 156 and 157. The signal in register 158 is the value of the signal in register 152. The signals in registers 157 and 158 are then applied to the quantizers 161 and 162 to provide output functions in accordance with the graph of FIG. 11.

The operations now to be described will involve the system of FIGS. 5–8 wherein one input signal $u_i$, one delayed feedback signal $x_{i-1}$ and the desired output signal $z$ are employed. The signals $u_i$ and $z$ have the values set out in Tables I and II.

It will be understood that the initial feedback signal $x_{i-1}$ is zero both during training and execution.

For such case, the operations will be described in terms of the successive control states noted in Table II.

Control state 0

Figure 8:
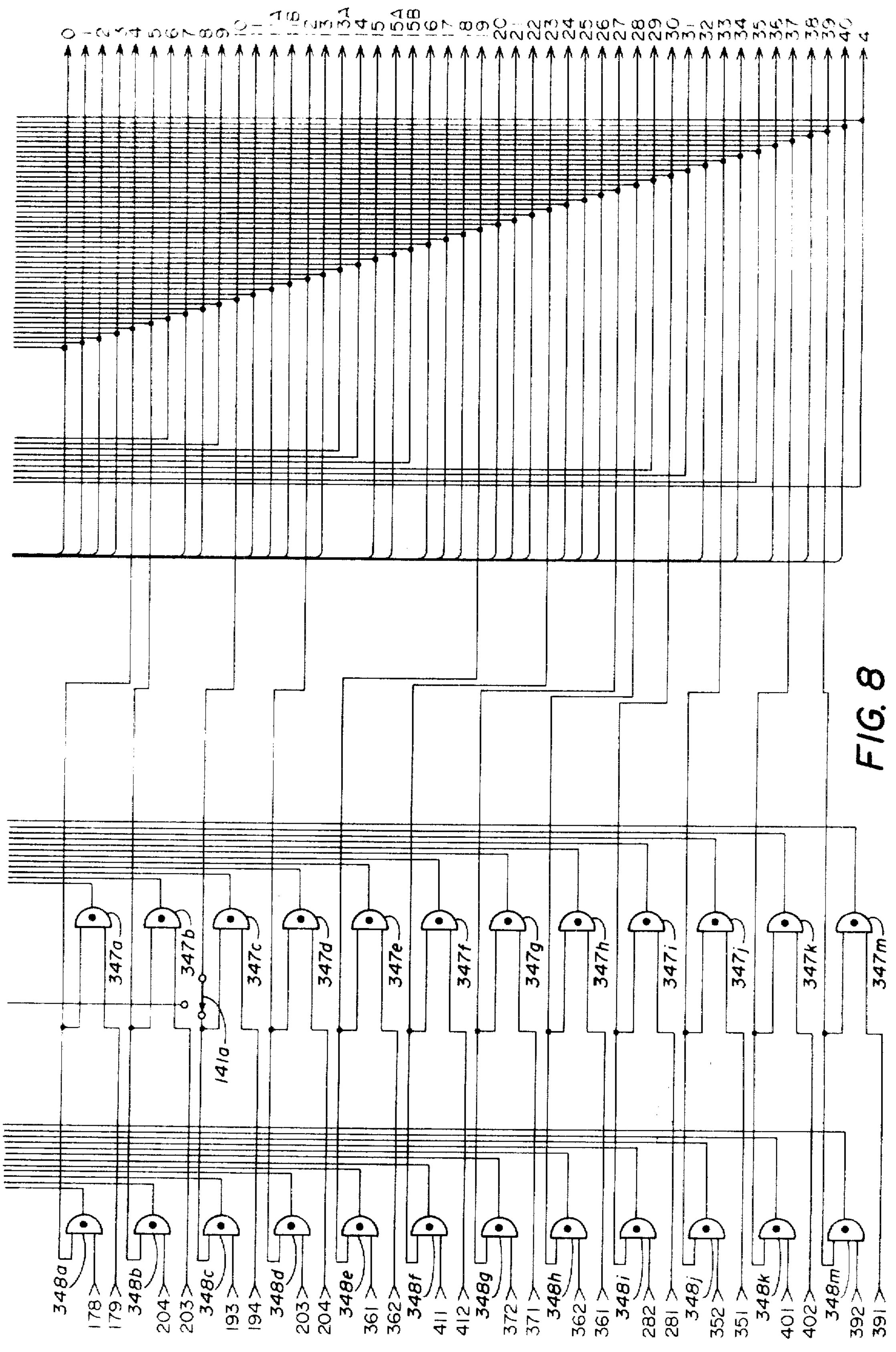

In this state, the decoder 332 applies a control voltage state on the control line designated by 0 which leads from FIG. 8 to FIG. 5. The term "control voltage" will be used to mean that a "1" state is present on the control line. This control voltage is applied to AND gate 301 to load a 0 into the register 152. This control voltage is also applied to the SET unit 290. Unit 290 loads IC register 260 with a zero, loads a register 201 with the digital representation of the number 2. It also sets all of the storage registers in the ID1 unit 184 and ID2 unit 221 to 0.

TABLE II

| Control State→ | 0 | 1 | 2 | 3 | 4 | 10 | 11 | 11A | 11B | 12 | 15 | 15A | 15B | 12 | 13 | 13A | 8 | 9 | 1 | 2 |
|---|---|---|---|---|---|---|---|---|---|---|---|---|---|---|---|---|---|---|---|---|
| u | | 2.5 | | | Test | Test | | | | Test | | | | Test | | | | | 1.5 | |
| $x_{i-1}$ | 0 | 0 | | | | | | | | | | | | | | | | 2/1 | | |
| $z_i$ | | 2.0 | | | | | | | | | | | | | | | | | 2 | |
| z | | | 2 | | Answer | Answer | | | | Answer | | | | Answer | | | | | | |
| Level | | | | 1 | | | | | | | 2 | | | | | | | | | |
| IDUM | | | | 1 | | | | | | | | 2 | | | | 3 | | | | |
| IC | 0 | | | | False | True | 1 | | | False | 2 | | | True | 3 | | | | | |
| N | 2 | | | | | | | | | | | | | | | | | | | |
| $IX_1$ | | | 32008 | | | | | | | | | | | | | | | | | 3200 |
| $IX_2$ | | | 32006 | | | | | | | | | | | | | | | | | 3200 |
| ID(1,1) | 0 | | | | | | | 32008 | | | | | | | | | | | | |
| ID(1,2) | 0 | | | | | | | | | | | 32006 | | | | | | | | |
| ID(1,3) | 0 | | | | | | | | | | | | | | | | 2 | | | |
| ID(1,4) | 0 | | | | | | | | | | | | | | | | | | | |
| ID(1,5) | 0 | | | | | | | | | | | | | | | | | | | |
| II(1,6) | 0 | | | | | | | | | | | | | | | | | | | |
| . | | | | | | | | | | | | | | | | | | | | |
| . | | | | | | | | | | | | | | | | | | | | |
| . | | | | | | | | | | | | | | | | | | | | |
| ID(2,1) | 0 | | | | | | | 0 | 1 | | | | | | | | | | | |
| ID(2,2) | 0 | | | | | | | | | | | | 2 | | | | | | | |
| ID(2,3) | 0 | | | | | | | | | | | | | | | | 1 | | | |
| ID(2,4) | 0 | | | | | | | | | | | | | | | | | | | |
| ID(2,5) | 0 | | | | | | | | | | | | | | | | | | | |

It will be noted that the control voltage on the 0 control line is applied by way of OR gate 335 and line 336 to each of AND gates 337a–f. AND gates 337a–f, because of the output of the incrementer 342, provide voltages on the lines leading to AND gates 331a such that on the next clock pulse from clock 330 applied to AND gate 333a–f from clock 330, a control voltage appears on the control line 1 with zero voltage on all of the rest of the control lines 0–41, FIG. 8.

Control state 1

In this state, the control voltage on line 159 of FIG. 5 is applied to AND gates 153–155 to load registers 156–158 with the digital representations shown in Table II. Register 156 is loaded with 2.0. Register 157 is loaded with 2.5. Register 158 is loaded with 0.

Control state 2

The control voltage on control line 2 causes the signals in registers 156–158 to be loaded into register 167–169. More particularly, the value of $z = 2$ is loaded on register 167. The value of 32008 is loaded into register 168 and the value 32006 is loaded into the register 169.

Control state 3

The control voltage appearing on control line 3 serves to load LEVEL register 200 with a digital representation of the number 1, and loads the same number into the register 191. This initializing operation has been shown in FIG. 5 as involving the set unit 302 operating in well known manner.

Control state 4

The control voltage on control line 4 is applied to comparator 177. At the same time, the control voltage is applied to AND gate 215 and through OR gate 212 to AND gate 211. This loads the contents of the register ID(1,IDUM) into register 176 and produces on lines 178 and 179 output signals representative of the results of the comparisons. Comparator 177 may be of the well-known type employed in computer systems. It produces a control voltage on line 178 if the contents of register 176 equals the contents of register 175. If the comparison is false, a control voltage appears on line 179. Register 175 is loaded by the application of the control voltage to AND gate 286 by way of OR gate 286a whereupon decoder 287 enables gate 173 or gate 174 to load register 175. In the example of Table II, the LEVEL register has a 1 stored therein so that the contents of register 168 are loaded into register 175. This test results in a control voltage appearing on line 179 and no voltage on line 178, because the signals in registers 175 and 176 do not coincide.

As above explained, when the comparison in unit 177 is false, the operation skips from control state 4 to control state 10 as shown in FIG. 4, the counter 331 being actuated to skip the sequence from 5–9. As a result the next control line on which a control voltage appears at the output of the decoder is control line 10.

Control state 10

Control line 10 is connected to the comparator 192 to determine whether or not the contents of register ID(2,IDUM) is equal to or less than the contents of IDUM register 191. This is accomplished by applying the control voltage on control line 10 through OR gate 224 to AND gate 223 by which means the contents of the register ID(2,IDUM) appear on line 229 which leads to register 190. The IDUM register 191 shown in FIG. 6 is shown dotted in FIG. 5. The output of register 191 is connected by way of line 222 to comparator 192. Thus, there is produced on lines 193 and 194 voltage states which are indicative of the results of the comparison in comparator 192. From Table II, the contents of ID(2,IDUM) register 190 is 0 and the contents of IDUM register 191 is 1, thus the comparison is true. A resultant control voltage appears on line 193 with zero voltage on line 194. The control voltage on line 193 acting through AND gate 348c causes the counter 331 to increment by a count of 1 to the next control state 11.

Control state 11

The control voltage appearing on line 11 is applied to AND gate 267 by way of OR gate 268 to increment the count from 0 to 1 in IC register 260.

Control state 11A

The control voltage on control line 11A is applied to AND gate 181, through OR gate 311, to apply the contents of register 175 to the input select unit 183. The address at which such contents are stored is determined by the application of control voltage on control line 11A to AND gate 262, by way of OR gate 309, so that the contents of register 175 are stored in ID(1,1). Control line 11A is also connected to AND gate 236 by way of OR gate 236a to apply to the input select unit 238 the contents of the A register 231. Contents of A register 231 correspond with the value stored at the ID(2,IDUM) by connecting control line 11A to AND gate 223, through OR gate 224. The contents of ID(2,1) was 0 so that such a value is now stored in ID(2,1).

Control state 11B

The control voltage on control line 11B is applied to AND gates 265 and 239 to store, at address ID(2,1) the voltage representative of the contents of register 260, i.e., a 1.

Control state 12

The control voltage on control line 12 is applied by way of OR gate 202a to comparator 202. The comparison is to determine whether or not the contents of register 200 equals the contents of register 201. At this time, register 200 contains a 1 and register 201 contains a 2. Thus, the comparison is false so that a control voltage appears on line 204 with a 0 voltage on line 203. Line 204 operates through AND gate 347d to set the counter 331 to skip to the control state 15.

Control State 15

The control voltage on control line 15 is applied to AND gate 304, through OR gate 305, to increment the value in register 200 from a 1 to a 2. Similarly, line 15 is connected to AND gate 267, through OR gate 268, to increment register 260 from a 1 to a 2.

Control state 15A

The control voltage on control line 15A is applied to AND gate 307, through OR gate 307a, to load the contents of register 260 into the register 191. Control line 15A is also connected to AND gates 181 and 286 to apply the contents of register 169 via register 175 to the input select unit 183. Control line 15A is also connected to AND gate 262, through OR gate 309, to control the location of the storage of the contents of register 175 in the ID1 register, namely at the location ID(1,2).

Control state 15B

The control voltage on control line 15B is applied to AND gate 241 to apply the contents of register 191 to the input select unit 238. The control line 15B is also connected to AND gate 262, through OR gate 309, to control location of storage by using the contents of register 260 to address the input select unit 238. As a result there will be stored at the location ID(2,2) the contents of register 191, namely, a 2. The completion of the operations of a control state 15B lead back to the comparison control state 12.

Control state 12

Upon this comparison, through application of the control voltage on control line 12 to comparator 202, it is found that the contents of register 200 equal the contents of register 201. Thus, on control state 12, the counter 331 is incremented to control state 13.

Control state 13

The control voltage on control line 13 is applied to AND gate 267, through OR gate 268, to increment the contents of register 260 from a 2 to 3.

Control state 13A

The control voltage on control line 13A is applied to AND gate 307, through OR gate 307a, to load the contents of register 260 into register 191. Control line 13A, FIG. 8, is connected to OR gates 346d and 346e to reset the counter 331 to control state 8.

Control state 8

In control state 8, the contents of the ID2 register 221 at the address corresponding with the contents of register 191, is to be incremented. The corresponding address in the ID1 register 184 is to be increased by the amount of the desired output $z$.

Thus, the control line 8 is connected to AND gate 223, by way of OR gate 224, to place onto line 229 the contents of the register ID(2,IDUM). Control line 8 is also connected to AND gate 316 whereby a 1 from source 313 is applied to the adder 230. The sum is then stored in register 231 and is applied, by way of AND gate 236 and OR gate 237, to the input select unit 238. Control line 8 is connected to AND gate 236 by way of OR gate 236*a* and to AND gate 239 by way of OR gate 240 so that the contents of register 231 are stored in register 221 at the location ID(2,IDUM).

Control line 8 is also connected to AND gate 211, by way of OR gate 212, to select from register 184 the value stored at ID91,IDUM). This value is then applied to adder 172 along with the current value of the desired output $z$. The sum then appears in register 214. This sum is then applied, by way of channel 275, to AND gate 308 and then by way of OR gate 182 to unit 183. This value is stored in unit 184 at the address controlled by the output of the registers 191 under the control of the voltage on control line 8 as connected to AND gate 255. Thus, a 2 is stored at the location ID(1,3). A 1 is stored at location ID(2,3).

Control state 9

In response to the control 9, the quantities ID(1,IDUM) and ID(2,IDUM) are applied to the divider 276 so that the quotient will be provided on line 277. The quantity stored at ID(1,IDUM) represents one value of a G matrix. The ratio of these two values represents the present state of the training that the unit has undergone to provide a trained response of 2.0 when the input is 2.5.

More particularly, control line 9 is connected to AND gate 211, by way of OR gate 212, to produce on line 213 the output ID(1,IDUM). This a 2. At the same time, the control line 9 is connected to AND gate 223, through OR gate 224, to provide on line 235 the voltage representative of ID(2,IDUM). This is a 1. Thus, the output on line 277 is a 2. This value is then applied by way of AND gate 278 for storage in register 152. Thus, there has been completed one cycle of the training operation.

It will be noted that in FIG. 7, the control line 9 is connected to OR gate 346*d* to reset the counter 331 to control state 1. Further the control states shift backwards on each of control states 6, 9, 13A, 14, and 15B. The control states shift forward on each of control states 4, 5, 10 and 12, depending upon conditions encountered. The shifts backward are unconditional. The necessary logic arrangement for shifting forward or backwards in accordance with FIG. 4 is implemented through OR gates 346*a–f* and AND gates 347*a–d*.

Just as the operations indicated on the flow diagram of FIG. 4 have been implemented in the special purpose computer of FIGS. 5–8, the same may also be implemented through use of software for the control and actuation of a general purpose digital computer. The system, however implemented, provides for an infinite quantization with minimization of the storage required, the storage in the registers 184 and 221 being allocated on a first-come, first-served basis with keys being provided for retrieval of any desired information either during the training or during the execution mode of operation.

From Table I it will now be noted that the second training sequence involves an input $u$ having a value of 1.5 and a desired output $z$ equal to 2.0. A series of operations then is performed similar to those above described. Without describing the subsequent operations in the detail above noted, the following represents the operations in response to the control states in the second training sequence.

Control state 1

Register 156 is loaded with 2.0 Register 157 is loaded with 1.5.

Control state 2

By reference to FIG. 6, it will be noted that register 168 is loaded with 32007. Register 169 is loaded with 32008.

Control state 4

On this test ID(1,IDUM) equals 32008 and IX(LEVEL) equals 32007 and, therefore, the test is false. Thus, the control is shifted to control state 10.

Control state 10

On this test, ID(2,IDUM) = 1 and IDUM = 1, therefore, the answer is true. Therefore, the operation shifts to control stage 11.

Control state 11

IC register 260 is incremented to 4.

Control state 11A

The number 32007 is loaded into ID(1,4). A 1 is loaded into ID(2,4).

Control state 11B

The contents of register 260, namely, a 4, is loaded into ID(2,1).

Control state 12

On this test the answer is false. Therefore, the operation shifts to control state 15.

Control state 15

LEVEL register 200 is incremented from 1 to 2. The IC register 260 is incremented from 4 to 5.

Control state 15A

The contents of IC register 260 are loaded into IDUM register 191. The value 32008 is loaded into ID(1,5).

Control state 15B

The contents of IDUM register 191 are loaded into ID(2,5). The operation then returns to control state 12.

Control state 12

This test now is true. Therefore, the operation shifts to control state 13.

Control state 13

Register 260 is incremented from 5 to 6.

Control state 13A

Contents of register 260 are loaded into register 191. Note the operation results in the shift to control state 8.

Control state 8

A 2 is loaded into ID(1,6). A 1 is loaded into ID(2,6).

Control state 9

A 2 is produced at the output of divider 276, being representative of the ratio ID(1,6)/ID(2,6). This returns the operation to control state 1.

The pattern of operation as outlined on the flow diagram of FIG. 4 may be followed by further reference to the control states noted on FIGS. 5–8 and the values which flow from the sequences found in Table I.

If the sequence set out in Table I is followed further in the detail above enumerated for samples 1 and 2, it will be found that there will be an expansion of the use of the computer components, particularly memory, in accordance with the successive values listed in Table III.

TABLE III

| Sequence | 1 | 2 | 3 | 4 | 5 | 6 | 7 | 8 |
|---|---|---|---|---|---|---|---|---|
| u= | 2.5 | 1.5 | 1.6 | 1.0 | 2.3 | 1.0 | 2.3 | |
| z= | 2 | 2 | 1 | 1 | 1 | 1 | 2 | |
| x= | 0 | 2 | 2 | 1.5 | 1 | 1 | 1 | 1.5 |
| N= | 2 | 2 | 2 | 2 | 2 | 2 | 2 | 2 |
| LEVEL= | 12 | 12 | 12 | 12 | 12 | 12 | 12 | |
| IDUM= | 123 | 156 | 1456 | 1458 | 1210 | 14578 | 12910 | |
| IC= | 0123 | 456 | | 78 | 910 | | | |
| IX(1)= | 32008 | 32007 | 32007 | 32007 | 32008 | 32007 | 32008 | |
| IX(2)= | 32006 | 32008 | 32008 | 32007 | 32007 | 32007 | 32007 | |

It will be noted that on line 1 of Table III the values of the input signal $u$ correspond with those found in Table I. Similarly, the values on line 2 correspond with the desired output values of Table I. On line 3, the values of the feedback signal are altered in dependence upon the training results.

On line 4, the N register stays constant at 2 throughout the entire operation since there are only two effective inputs, i.e., $u$ and $x_{t-1}$. On line 5, the level changes from 1 to 2 in each sequence as the search for a given address changes from first level in the tree storage to the leaf level.

On line 6, the IDUM register 191 of FIG. 6 varies throughout the sequence from the starting value of 1 to a maximum of 10. It will also be noted that the IC register includes storage which varies from an initial value of 0 to the maximum of 10 in an ordered sequence. The value stored in registers IX(1) and IX(2) correspond with the quantization levels for the input values $u$ and $x_{t-1}$ as determined by the graph of FIG. 11.

The manner in which the storage is utilized is illustrated in Table IV, where /, i.e., ∅, signifies storage replacement.

TABLE IV

| IC | ID(1,IC) | ID(2,IC) |
|---|---|---|
| 1 | ∅ 32008 | ∅ 1̸ 4 |
| 2 | ∅ 32006 | ∅ 2 9 |
| 3 (matrix elements) | ∅ 2 | ∅ 1 |
| 4 | ∅ 32007 | ∅ 1 |
| 5 | ∅ 32008 | ∅ 5 7 |
| 6 (matrix elements) | ∅ 2 3 | ∅ 1̸ 2 |
| 7 | ∅ 32007 | ∅ 5 |
| 8 (matrix elements) | ∅ 1̸ 2̸ | ∅ 1̸ 2 |
| 9 | ∅ 32007 | ∅ 2̸ |
| 10 (matrix elements) | ∅ 1̸ 3 | ∅ 1̸ 2 |
| 11 | 0 | 0 |
| 12 | 0 | 0 |

It will be noted that the G and A matrices values are found at addresses in ID1 and ID2 corresponding to the third, sixth, eighth and tenth locations.

For any sequence of input signals $u$ and desired output signals $z$, the processor is trained so that it will provide the answer most representative of the desired response in post training operations. The example given is elementary and has been purposely so designed in order to assist in understanding the invention. It will be understood, however, that a plurality of input signals and/or a plurality of feedback signals may be employed. Thus, the flow chart of FIG. 4 is of general applicability. The special purpose computer of FIGS. 5–8 has been tailored to the two input example set out in Table I. To accommodate more inputs, additional registers such as register 157 for input signals and such as register 158 for feedback signals $x_{t-2}$, etc., would be provided. Thus, there is presented the system of FIGS. 5–8 by way of example, recognizing and emphasizing the general applicability of the method and system disclosed herein.

OPERATION—EXECUTION

After completion of training, system changes are made as represented by opening of switches 140, 140*a*, 140*b* and 141. Thereafter, the execution sequence of Table I may be followed by reference to FIG. 4 and FIGS. 5–8. When the switches 140, 140*a*, 140*b* and 141 are in the execution position, control state 8 is ineffective thus producing the same effect as a direct shift from control state 7 to control state 9. Control state 10 will transfer to control state 16 rather than 11 when the test in control state 10 is true.

Control state 16

This state represents the system as it reacts during execution when it encounters an untrained point. There are different methods possible for proceeding when an untrained point is encountered. One way should be to utilize the preceeding trained point through use of a first order delay for state 16 and return from state 16 directly to state 1. This could be done and if such procedure were acceptable for all operations, there would be no need to add the portion of the system shown in FIGS. 9 and 10.

From the foregoing it will be seen that the operations shift backwards on each of control states 6, 9, 13A, 14 and 15B. The control states shift forward on each of control states 4, 5, 10 and 12, depending upon conditions encountered. The shifts backward are unconditional. The necessary logic arrangement for shifting forward or backwards in accordance with FIG. 4 is implemented through OR gates 346*a–f* and AND gates 347*a–d*.

Just as the operations indicated on the flow diagram of FIG. 4 have been implemented in the special purpose computer of FIGS. 5–8, the same may also be implemented through use of software for the control and actuation of a general purpose digital computer. The system, however implemented, provides for an infinite quantization with minimization of the storage required, the storage in the registers 184 and 221 being allocated on a first come, first served basis with keys being provided for retrieval of any desired information either during the training or during the execution mode of operation.

PREFERRED UNTRAINED POINT EXECUTION

Use of the last trained point when, in execution, an untrained point is encountered, would permit the operation to continue with the untrained point being replaced by the previous trained response of the system. However, such a mode of operation is not the most preferred, especially in problems not involving time sequences of continuous training functions, even though such mode is easy to implement.

A preferred mode of operation involves use of the portions of the system, when an untrained point is encountered during execution, shown in FIGS. 9 and 10 responsive to control states 16–41.

FIGS. 9 and 10

In FIGS. 9 and 10 the portion of the system illustrated provides for carrying out the expanded search operation of FIG. 4. This portion of the system may be used to carry out a search operation for testing with untrained points in execution.

The system serves to compare an untrained key, component by component, with stored keys previously entered in register 181. The manner in which this is done is to compare the untrained component stored in IX(1) with the first key component of the first path stored in register 184. The difference between the first untrained and the first rained key component is then stored. The second untrained and second trained key components are then compared and the difference is stored. Such a sequence of comparisons continues from the root of the first path to the leaf. Each difference is multiplied by an appropriate preassigned weight designated by WT(i) in FIG. 4, and the weighted differences are then summed. Of course, the values of WT(i) may be unity so that the sum of the differences is obtained. Thereafter, the untrained key is compared with the second trained key, component by component, and the weighted differences are summed. At the end of this sequence a comparison is made to see if the difference between the untrained key and the second reference key is less than the difference between the untrained key and the first trained key. If it is not, the first difference is retained in storage and the untrained key is compared, component by component, with the third trained key. If a subsequent trained key is found to be closer to the untrained key, then the pertinent values relative thereto are stored. Thus, the operation continues to provide a stored array of differences pursuant to steps 16–35 of FIG. 4. As minimum error trained responses are identified in control states 16–35, the G and A matrix values are stored.

If there are several trained keys found to be equally close to the untrained key, then, in the steps 36–41 of FIG. 4, a choice is made between those of apparent equal closeness. While only one basis for the latter choice has been shown in detail as implemented by steps 36–41 of FIG. 4, other bases for such choice will also be described. Thus, with the foregoing general understanding of the operation to be followed when an untrained point is encountered, reference may now be had to the circuit of FIGS. 9 and 10. After the best fit is found, the ratio G/A is then produced and stored in register 152, FIG. 5, and the execution operation returns to normal and continues until an untrained point is next encountered.

The system includes a dummy register 402 in which I values are stored. While this register could be the same as register 175, FIG. 5, a separate unit has been shown and will be described in operation independent of register 175. It serves the same function in FIGS. 9 and 10 as unit 175 serves in FIG. 5.

The value stored in register 402 appears on its output channel for use at various points required by FIG. 4. Provision is made for incrementing or decrementing the count stored in register 402. More particularly, a +1 source 402*a* and a −1 source 402b are provided, together with adders 402c and 402d. The output of adder 402c is connected by way of AND gate 402e and OR gate 402f to register 402. AND gate 402c is enabled by way of the output of an OR gate 402g. Control states 16 and 36 are applied to OR gate 402g by way of OR gate 402h. Control states 27, 29 and 40 are applied to OR gate 402g by way of OR gate 402i. The output of OR gate 402i is also applied to one input of an AND gate 402j which is ANDed with the output of register 402 to perform the summation in unit 402c. Control state 32 is applied to AND gate 402k to perform the decrementing operation involving source 402b.

An array of weighting registers (WT) 405 are provided for storing weighting functions preset prior to operation. The weighting functions are selected to represent multipliers predetermined as will hereinafter be set out. The selected values stored in the register 405 may be read from storage by way of output select unit 405a. The address is provided for output select unit 405a by way of AND gate 405b. The inputs to AND gate 405b are the I values from register 402 and control states 17 or 25 applied by way of OR gate 405c.

An output select unit 405d is employed to read from registers 168, 169 or other registers associated therewith in which the IX values or keys are stored. The address for output select unit 405d is provided by way of AND gate 405e which is enabled by control state 18 and the I value from register 402. The IX values from unit 405b are applied by way of AND gate 405f to a subtraction unit 405g. AND gate 405f is enabled by either of control states 17 or 25 applied thereto by way of OR gate 405h. The output select unit 210 shown dotted in FIG. 10 is shown in its relationship to register 184, FIG. 6. The value on path 210a is applied to subtraction unit 405g. The difference output is then applied to a multiplier 405i whose second input is derived from output select unit 405a and is a weighting function. The product is then applied by way of an input select unit 405j to the IE(I) array registers 404. Array 404 serves to store the individual node errors for the leaf under consideration.

Any error value stored in register 404 may be read by way of an output select unit 404a in response to control state 35 at the address N by way of AND gate 404b. The output may also be selected in response to control state 21 at the address I by way of AND gate 404c. It may also be read in response to control state 18 at address I by way of AND gate 404d. Gates 404c and 404d are connected to unit 404a by way of OR gate 404e.

A K register 406 stores K values representing a value at any point in time which defines the path under test. These are numerical values utilized in determining where the operation is in the flow diagram of FIG. 4. IDUM values from unit 191, FIG. 4, are stored in registers 406 by way of an input select unit 406a. The address in K register 406 at which such values are stored is determined by the output of AND gate 406b having the I values applied to one terminal thereof and in response to either control state 17 or 25 from gate 405h.

The values stored in K register 406 may be read by way of output select unit 406c. The address is selected in response to control state 34 by way of AND gate 406d, the address being the value I from register 402. The output is applied by way of AND gate 406e and OR gate 406f to IDUM register 191.

The IDUM register may also be loaded with a 1 from a source 406g by way of AND gate 406h in response to control states 16 or 36.

The IDUM register 191 may also be loaded with the quantity I+1 by way of the summation unit 406i and AND gate 406j in response to control state 38.

An ITOT register 403 is provided to store a value representative at any time of the total error for the particular leaf under consideration. The value is derived from IE(I) register 404 as read by unit 404a. The latter value appears on path 403a connected to AND gates 403b and 403c. AND gate 403b is enabled by control states 18 and 26 by way of OR gate 403d. AND gate 403c is enabled by control states 21 or 35 by way of OR gate 403e. The output from register 403 is applied to a summation unit 403f along with the outputs of AND gate 403b, the sum being applied by way of AND gate 403g and OR gate 403h to register 403. The difference output is derived by a subtraction unit 403i whose output is connected by way of AND gate 403j and OR gate 403h to register 403.

Comparator 350, responsive to control state 33, compares the I value from register 402 with zero from source 353 to produce the appropriate outputs on output lines 351 and 352.

Comparator 360, in response to control state 19 or 28 applied through OR gate 363, compares the I value from register 402 with the N value from register 201, FIG. 5, to produce the appropriate output states on lines 361 and 362.

Comparator 370 compares the value stored in register 403, namely ITOT, with the value in register 409, namely ITOTAL. ITOTAL register 409 contains a value representative at any given time of the smallest error encountered at that time. The comparison in unit 370 is carried out in response to control state 27. The value from register 403 may be stored in register 409 in response to control state 20 by way of AND gate 409a. The output of comparator 370 appears on lines 371 and 372 and is true if the value stored in register 403 is greater than the value stored in register 409.

Comparator 380, in response to control state 30, determines whether or not the value stored in register 409 is equal to the value stored in register 403 to produce the appropriate voltage states on output lines 381 and 382.

JC register 401 is a dummy register for storing integers. In response to control states 16, 21 and 31, a 1 from source 401a is applied by way of AND gate 401b to an adder 401c, the output of which is connected to the input to register 401. The contents of unit 401 is incremented by way of AND gate 401b in response to control state 21.

The output of register 401 is connected by way of AND gate 401e along with control state 20 to select addresses for storage of values by way of input select units 407a and 408a leading to sets of registers 407 and 408, respectively. The output of register 401 is also connected to a comparator 390. The other input to comparator 390 is supplied by way of unity source 393 and adder 394 so that there appears on line 395 the quantity I+1. In response to control state 39, comparator 390 determines whether or not the contents of JC are equal to I+1. Appropriate voltage states will then appear on output lines 391 and 392.

Selected values from output select unit 210 are applied by way of AND gate 407b along with control state 20 for storage by way of input select unit 407a for registers 407. Similarly, selected values from output select unit 220 are applied by way of AND gate 408b along with control state 20 for storage in registers 408 by way of input select unit 408a.

Values stored in registers 407 and 408 are selected to be read by way of output select units 407c and 408c. The address from which values are to be read are specified by IDUM signals appearing at the output of IDUM unit 191 and control state 41, the latter being applied by way of AND gates 407d and 408d. It will be noted that control states 37 and 38 are connected to OR gate 408e to read from address I+1 in register 408 through unit 408c. Control states 37 and 38 are connected through AND gate 408f and OR gate 408g.

The output read by unit 407c is applied to a divider 407f. The second input to divider 407f is provided at the output of unit 408c. The output of divider 407f is transmitted by way of AND gate 407g as enabled by control state 41 to the input register 152, FIG. 5.

The output select unit 408c is connected to comparator 400 and in response to control state 37 determines whether or not the value read by unit 408c is greater than the value stored in an IOUT dummy register 403. Thus, output states appear on output lines 401 and 402. The value stored in register 403 is the value I from register 402 in response to control state 36. This value is stored by way of AND gate 403a and OR gate 403b. The value from select unit 408c may be stored in register 403 by way of AND gate 403c in response to control state 38.

Comparator 410 is employed to determine whether or not the quantity ID(2,IDUM+1) as it appears at the output of select unit 220 is greater than the quantity IDUM stored in register 191. More particularly, the output of unit 220 is connected by way of AND gate 410*a* to the comparator. The output of IDUM register 191 is connected by way of AND gate 410*b*. By this means appropriate voltage states appear on lines 411 and 412.

EXPANDED SEARCH OPERATION

In execution, it should be remembered that the key components stored in registers 184 and 221, FIG. 6, are identifiers that define specific trained responses. When an untrained component occurs, a key component has been generated from a key comprising a set of key components that has been encountered for which no such key occurred in training. The expanded search operation is based upon the proposition that since the keys describe the appropriate trained responses, then a comparison of the untrained key with the trained keys is an intelligent means for applying what has been trained to a new unknown which is encountered in similar circumstances. Therefore, the difference between the untrained key and the trained key of the file is made the criteria for determining responses appropriate to the new input condition which is the untrained key. Thus, during execution when an untrained point is encountered, the operation shifts to control state 16. Control state 16 is the first control state in the flow diagram of FIG. 4. On control state 16 the registers JC and IDUM are set to a value of one. Register ITOT is set to zero.

On control state 17, the value ID(1,IDUM) and the value IX(I) are fetched from their storage registers. ID(1,IDUM) is read from register 184. IX(1) is read from register 168. The difference between them is then produced in unit 405*g* and the difference is multiplied in unit 405*i* by the weighting function from register 405. The result is then stored in the first element IE(1) of register 404. At the same time, the value IDUM is loaded into the K register 406.

On control state 18, register 403 is loaded with the error value stored in register IE(1). The new key component stored in register 168 has thus been compared with the key component stored in register 184. The difference is produced and is stored in array 404 and in register 403. The subsequent operation is then carried out to compare IX(2), the untrained key component in register 169 with the second key components of the trained response in the first chain previously stored during training in register 184.

On control state 19, a comparison is made to see if the contents of I register 402 equals the contents of N register 201. Since in this example N=2 and at this time I=1, the answer is no. As a result on control state 22, I register 402 and IDUM register 191 are incremented. Thereafter, control states 17 and 18 are repeated with I=2. Following the repeat of states 17 and 18, the comparison of state 19 is true so that the operation proceeds to control state 20. In response to control state 20 the value stored in register 403 is also stored in register 409. The register IGI(JC) is enabled to receive and store the G value from register 184 found at the address ID(1,IDUM+1). Similarly, the register 408 receives the A value from register 221 found at the address ID(2,IDUM+1).

On control state 20 the value stored in register IE(N) is subtracted from the quantity stored in register 403 and the difference is then stored in register 403. At the same time JC register 401 is incremented.

On control state 23 a comparison is made to see if ID(2,IDUM) is greater than IDUM. If the comparison is true, then the operation proceeds through steps 24–31 wherein comparisons are made between the untrained key components and the trained key components in all the subsequent chains. If the comparison of control state 23 is false, then the operation may lead to state 36 in which one or more G values will be stored in array 407 and one or more A values will be stored in array 408. States 36–41 then are followed to select from arrays 407 and 408 the G and A values, respectively, which correspond with the largest A value. More particularly, the reasoning is that if the differences between untrained key components and the key components leading to the values stored in arrays 407 and 408 are the same but one of those paths, during training, was followed more times than the other, then it is more probable that the trained response for which the A value is maximum will most likely be the desired response for the untrained key components. Thus, through the operations indicated in states 36–41, the most likely G and A values are applied to divider 407*f* in response to control state 41 and the quotient is then applied by way of AND gate 407*g* to the register 152, FIG. 5.

The output decision made in control states 36–41 selects an output from the results obtained by the search procedure based on maximum likelihood criteria. For example, suppose several answers are retrieved all of which satisfy the minimum error criteria $$\sum_{I=1}^{N} WT(i)*DIF[IX(i),\ KEY(i)]$$

Then JC = number which satisfies the criterion and IGI and IAI arrays 407 and 408 contain their G and A values. A decision is then made as to which answer to select. By way of example, suppose three "leaves" all satisfy the error criterion then IGI, IAI registers

| IGI | IAI |
|---|---|
| $G_1$ | $A_1$ |
| $G_2$ | $A_2$ |
| $G_3$ | $A_3$ |

The output decision may yield any of the following:

a. Maximum Likelihood—Determine which $A_i$ is largest and make $\hat{X}=G_i/A_i$ for the value of $i$ as above described b. Majority Rule—Calculate $\hat{X}_i=G_i/A_i$ for $i$=1,2,3. If two or more of the $\hat{X}_i$ agree, select that value.

(c) Weighted average—Make $\hat{X}=\frac{G_1+G_2+G_3}{A_1+A_2+A_3}$

In addition to the Maximum Likelihood, Majority Rule, and Weighted Average choices above discussed, a nearest neighbor or a committee method may be used. In the nearest neighbor (kNN) and committee rule several responses are located rather than a single response (in general) as is done in the processor described by flow graphs. In kNN a value is assigned to $k$ and then $k$ responses are located whose mismatch is smallest. For example, if $k$ = 6, the six responses with the smaller mismatch would be located without any consideration as to the magnitude of the mismatch.

In committee method as defined here, a mismatch threshold is assigned and all responses which have a mismatch below this threshold are used in a majority decision. Thus, several such responses are located but all are assured to be below the mismatch threshold. The majority rule is then employed.

As previously indicated, weighting functions are accommodated in the expanded search by the inclusion in FIG. 9 of WT registers 405. They permit presetting the values of a multiplier for difference value output of unit 405*g*. It may be, for a given type of operation, that the error at the first node may be twice as important as all the rest. In such case, register 405 would have the values WT1 = 2, WT*a* = 1, WT3 = 1 and WTN = 1. Other weight sequences may be employed as an operator may desire or an operation may require.

It has been observed in the foregoing discussion that the procedures by which specific trained responses are stored or retrieved are constituted by sequential operations involving the components of the key. However, the level iterations which proceed from level to level in the tree are identical in principle. That is, the node value is examined for selection; if selected, the ADF linkage transfers operation to the next level; if not, the ADP transfers operation to another node in the filial set at any time the level iteration is confined to a single level of the tree. If independently addressable memories are provided such that one memory is devoted to each tree level, when it is physically possible to conduct search operations in all levels simultaneously. Of course, the search of level $i$ for a given training cycle cannot proceed until the search of level $i-1$ is completed. However, the $i^{th}$ key component of training cycle k can be examined at level $i$ while the $(i-1)^{th}$ key component of training cycle k+1 is being examined at level $i-1$. The time for any individual level iteration will remain essentially unchanged by this procedure. However, with N level iterations proceeding simultaneously, the throughput will be increased approximately N-fold, where N is the number of levels in the tree. Thus, in effect, speed will be increased N times. There will, of course, be a fixed time delay in processing an input through the system.

Since new information follows old as it is processed through the three, this method is of the "pipelining" type. For a detailed discussion of pipelining see application Ser. No. 743,573, filed July 9, 1968 entitled "Pipelined High Speed Arithmetic Unit." The essential techniques as it relates to this invention are presented in the following.

Figure 12:
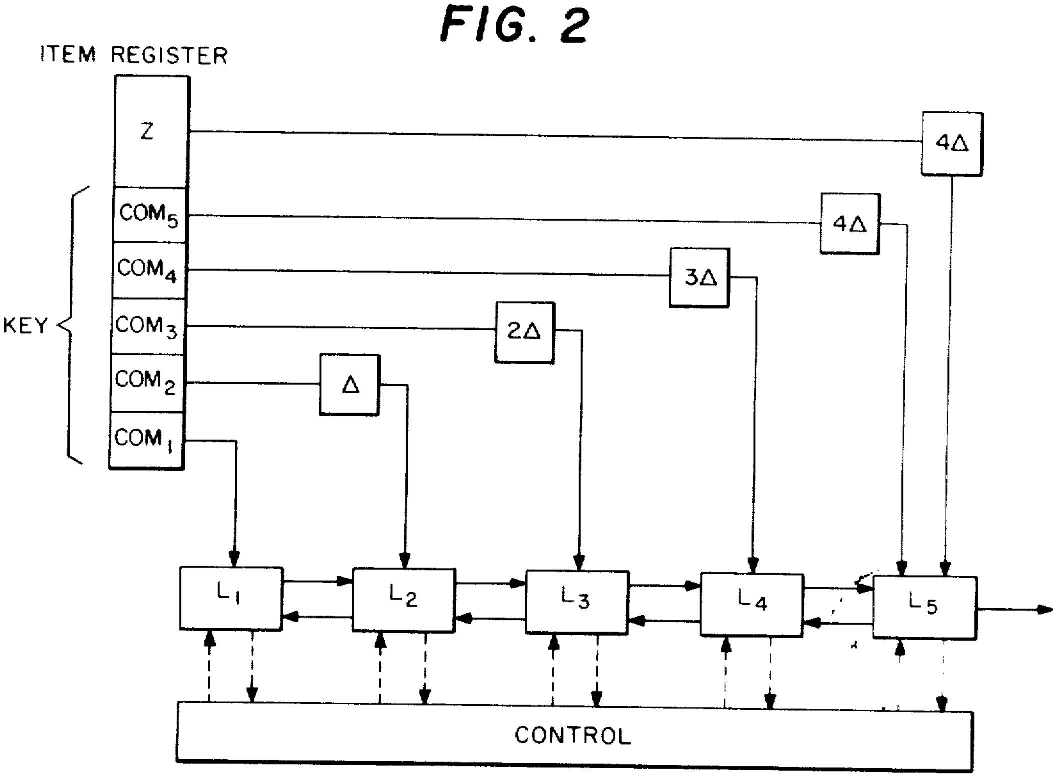
FIG. 12 is a symbolic illustration by which pipeline techniques may be employed in conjunction with the tree storage procedure to effect rapid information storage and retrieval.

FIG. 12 presents in simplified form an implementation of a pipelined tree allocated file having five levels. The five key components are stored in the item register and are designated $COM_1$–$COM_5$. The desired output Z, which is used in establishing the trained response during training is also stored in said register. The elements designated Δ, 2Δ . . . are standard delay units as described in FIG. 1 in which Δ delays the input by one sample, 2Δ delays the input by two samples, etc. The units designated $L_1$, $L_2$, . . . are independent memory units and associated logic which constitute the node structure and branching operations for their respective levels of the tree. The block labeled CONTROL supervises the overall operational integration of $L_1$, $L_2$, . . . .

In operation, each component of the key is gated to the appropriate level of the tree by the channels indicated. For example, $COM_1$ is gated to $L_1$, the delayed $COM_2$ to $L_2$, etc. The node values and ADP of the nodes contained in each memory unit are used to locate the anode whose value matches the corresponding input key component from the item register. The ADP is used within a memory unit to link all anodes of a given filial set in the manner disclosed previously. When a node is selected the ADF of that node designates the appropriate entry node of the succeeding memory unit designating the filial set of nodes which will be considered for selection.

During training iteration 1, the first key, KEY 1, and corresponding desired output $Z_1$, are loaded into the item register. Thereupon the first component of the key, $COM_1$, is applied to the memory unit $L_1$. Through utilization of the node values and ADP entries of $L_1$, either a node is selected from $L_1$ or an additional node is created in $L_1$ by the means discussed previously. On training iteration 2, the second key KEY 2, and desired output $Z_2$, are loaded into the item register while the first component of KEY 2 is applied to $L_1$ to select or add a node whose value matches the first component of KEY 2. Simultaneously the second component of KEY 1 emerges from the delay unit Δ and is applied to unit $L_2$ along with the ADF address from $L_1$ determined in the first level iteration. Thus, the $COM_2$ from KEY 1 is used to select or generate a node in $L_2$ whose value equals $COM_2$.

The above procedure continues until the fifth training iteration at which time the fifth key KEY 5, is loaded into the item register; the first component of KEY 5 is applied to $L_1$ to select or generate a node whose value equals said first component; the second component of KEY 4 and an ADF signal from $L_1$ are applied to $L_2$ to select or generate a node whose value equals said second component; the third component of KEY 3 and an ADF signal from $L_2$ are applied to $L_3$ to select or generate a node whose value equals said third component; the fourth component of KEY 2 and an ADF signal from $L_3$ are applied to $L_4$ to select or generate a node whose value equals said fourth component; the fifth component of KEY 1, the first desired output $Z_1$, and an ADF signal from $L_4$ are applied to $L_5$ to select or generate a node which will contain either the trained response or addresses from which the trained response, as determined from $Z_1$, can be obtained. This training iteration completes the first training cycle since the trained response for KEY 1 has been completed. However, note that four-fifths of the training cycle for KEY 2, three-fifths for KEY 3, etc. have also been completed so that on the subsequent iteration the training cycle for KEY 2 will be completed, on the one after that, the cycle for KEY 3 will be completed, etc. Thus, every iteration, once the pipeline has been loaded, completes a training cycle, and the effective throughput time is no longer than that required to search a single memory unit.

It is observed from the foregoing discussions that sundry tests and transfers are required at the first level of the tree to determine the appropriate filial set to be searched at the second level. The time required to implement these operations can be saved at very little expense in storage by employing the first key component to direct address the appropriate entry node at the second level. This allows a much larger group of roots to be employed than would otherwise be feasible and has a favorable impact on propagation delay (the lag between the input of a sample and the emergence of the corresponding actual output). From the second level on the customary tree procedure is employed.

Note that all components of the key are still employed in defining the appropriate trained response since the first key component exerts exactly the same effect as it does in the standard tree operation. This operation may be regarded as employing direct addressing techniques for the first key component and tree procedures for the remaining components. It is to be understood that such modifications might be employed herein.

In the foregoing descriptions the value portion of the nodes contain the components of the key so structured such that each node contains one key component whereby applications having N key components have N levels in their tree structure. This results in a uniform N level tree. However, with slight modification a value can contain two or more key components such that a nonuniform tree can result. It is known that the optimum trade off between required memory and training cycle time is realized when each filial set contains approximately four nodes. The capability for varying the number of key components in each node value is a technique by which the number of nodes per filial set can be governed so that near optimum performance can be achieved. It is to be understood that such implementation of nonuniform tree operations may be employed herein. Also note that the bits of information per key component can be varied to achieve a desired tree structure. For example, more bits may be assigned components corresponding to higher levels in the tree.

In accordance with the invention there is employed a trainable processor to which are applied a plurality of successive sets of samples of signals including at least one input signal. Storage means stores in digital quantized form each member of each contemporary set of the input signals and the contemporary value of the desired processor response to the contemporary set. Processor means generates a trained response dependent upon the contemporary set and upon the desired response. An addressable memory means stores at successive memory locations the members of the first of the successive sets in a selected order followed by the trained response of said processor to such set and to desired response. In the same order, comparison means compares members of each subsequent set of input signals with corresponding members in the memory. Logic means responds to the comparison means to store at successive locations in memory any member of a subsequent set which does not match its corresponding stored member followed by subsequent members in the same order and a trained response for the subsequent set. Finally, logic means respond to the comparison for modifying the trained response of a prior set when a subsequent set matches corresponding members in storage.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an automatic trainable signal processing machine where a set of input signals which are single valued functions of timed, including at least one input signal $u$, is used in training along with a desired output signal $z$, the method which comprises:

a. quantizing samples of said input signals by conversion to digital representations,
b. storing quantized values of each said digital representation as keys,
c. repeatedly storing trained responses dependent upon said signals $u$ and $z$ in random access memory locations at storage locations used only as a new key is encountered to store a trained response of said processor for each key, and
d. following training, extracting trained responses from storage locations determined by samples of a like set of input signals.

2. In an automatic trainable signal processing machine where a set of input signals which are single valued functions of time including at least one input signal $u$ is used in conjunction with a desired output signal $z$, the method of training which comprises:

a. digitizing the set of input signals to form key components,
b. generating trained responses for new sets of key components at least in part dependent upon the value of the desired output signal, and
c. storing said key components and said trained responses in a tree storage array in a random access memory.

3. In an automatic data processing machine which is trainable to process signals in a predetermined manner, the method which comprises, during training:

a. digitizing successive samples of a plurality of input signals to form storage keys,
b. generating trained responses for each set of input signal samples in dependence upon the levels of said signal samples, the desired processor response to said set of input signals and the frequency at which each set of said input signals is encountered,
c. storing in a tree storage array in a random access memory system said keys and the trained response for each key, and for each said set encountered during subsequent execution, d. retrieving from storage the trained responses in dependence upon a like set of input signals.

4. A trainable processor where a plurality of successive sets of samples of signals including at least one input signal which comprises:

a. means for storing in digital quantized form each member of each contemporary set of said input signals and the contemporary value of the desired processor response for said contemporary set,
b. means in said processor for generating a trained response dependent upon said set and said desired response,
c. an addressable memory for storing at successive memory locations the members of the first said set in a selected order followed by the trained response of said processor to said first set and said desired response,
d. means for comparing in said order members of each subsequent set of input signals with corresponding members in said memory,
e. logic means responsive to said comparison means for storing at successive locations in memory any member of a subsequent set which does not match its corresponding stored member followed by subsequent members in said order and a trained response for said subsequent set, and
f. logic means responsive to said comparison for modifying the trained response of a prior set when a subsequent set matches corresponding members in storage.

5. The system according to claim 4 wherein the elements thereof are structured in response to means for applying programmed instructions to a digital computer.

6. A trainable automatic signal processor where at least one input signal $u$ and desired output signal $z$ are employed which comprises:

a. means for quantizing samples of said signals $u$ and $z$ at like times by conversion to binary digital representations,
b. means for storing quantized values of each said sample,
c. means for control of repeated storage of trained functions dependent upon said signals $u$ and $z$ in random access memory locations by the assignment and use of an additional storage location only as a different combination of the quantized values of said signals $u$ is encountered to establish a trained response on said processor for each combination of said input signals, and
d. means operative following training, for extracting output signals of trained responses from storage in dependence upon digitized samples of said input signal $u$.

7. In a trainable automatic signal processing machine where at least two input signals dependent upon a signal $u$ and a desired output signal $z$ are employed, the combination which comprises:

a. means for repeatedly sampling and digitizing said input signals,
b. means for generating trained response for each level dependent combination of said input signals in dependence upon said desired output signal, and
c. means for storing each new combination of level dependent samples of said input signals followed by the trained response for said new combination in a tree storage array in a random access memory.

8. The system according to claim 5 wherein said means comprise an automatic data processing machine with means responsive to a programmed structure for controlling the sequence of operations therein.

9. The system according to claim 5 wherein said means comprise a general purpose automatic data processor with program response means for controlling the sequence of operations therein.

10. In an automatic data processor which is trainable to process signals in dependence upon the statistical nature of signals used during training, the combination which comprises:

a. means for obtaining successive time samples and for digitizing the successive samples of processor input signals,
b. means for generating trained responses for each unique set of input signal samples including the levels of at least one new input signal sample, a delayer sample of said input signal, the desired response to said sample and the frequency at which each said unique combination is encountered,
c. means for storing in a tree storage array in a random access memory system the members of said combination followed by trained responses therefor, and
d. means responsive to each said level dependent combination encountered during subsequent execution for retrieving from storage the corresponding trained response.

* * * * *